United States Patent [19]

Okuno et al.

[11] Patent Number: 5,324,357
[45] Date of Patent: Jun. 28, 1994

[54] EXTRUSION COATING APPARATUS

[75] Inventors: Tetsuo Okuno; Shigetoshi Kawabe; Seiichi Tobisawa, all of Hino, Japan

[73] Assignee: Konica Corporation, Tokyo, Japan

[21] Appl. No.: 948,400

[22] Filed: Sep. 21, 1992

[30] Foreign Application Priority Data

Oct. 1, 1991 [JP] Japan .................. 3-253705

[51] Int. Cl.$^5$ .............................. B05C 3/18
[52] U.S. Cl. .................. 118/411; 118/412; 118/419
[58] Field of Search ............ 118/410, 411, 412, 419

[56] References Cited

U.S. PATENT DOCUMENTS

| | | | |
|---|---|---|---|
| 5,042,422 | 8/1991 | Tobisawa et al. | 118/410 |
| 5,083,524 | 1/1992 | Hiraki et al. | 118/407 |
| 5,097,792 | 3/1992 | Umemura et al. | 118/314 |
| 5,105,760 | 4/1992 | Takahashi et al. | 118/410 |
| 5,167,713 | 12/1992 | Watanabe | 118/411 |
| 5,186,754 | 2/1993 | Umemura et al. | 118/411 |

FOREIGN PATENT DOCUMENTS

| | | | |
|---|---|---|---|
| 4010736 | 10/1990 | Fed. Rep. of Germany | B05C 11/04 |
| 4011279 | 10/1990 | Fed. Rep. of Germany | B29C 47/02 |

OTHER PUBLICATIONS

Patent Abstracts of Japan, vol. 13, No. 472 (C-647); Oct. 25, 1989 JPA-1-184072; Jul. 21, 1989.

Primary Examiner—Michael W. Ball
Assistant Examiner—Francis J. Lorin
Attorney, Agent, or Firm—Jordan B. Bierman

[57] ABSTRACT

An extrusion coating apparatus for magnetic recording media, which have excellent electro-magnetic conversion characteristics, is capable of coating thin layers stably at high speed. The object of the invention is achieved by the use of certain predetermined shapes for edges of the coating head.

7 Claims, 9 Drawing Sheets

EXTRUSION COATING APPARATUS

FIELD OF THE INVENTION

The present invention relates to an apparatus for extrusion coating and a method of extrusion coating using the apparatus, particularly to coating for a magnetic recording medium of a coated type, and more particularly to a coating apparatus capable of coating stably at high speed for a thin coated layer and a coating method employing the apparatus.

BRIEF DESCRIPTION OF THE DRAWINGS

FIG. 5 (b) is a sectional view of a coating apparatus of the invention,

FIG. 5 (c) is a sectional view of a coating apparatus of the invention,

DESCRIPTION OF SYMBOLS

1. Front bar
2. Back bar
3. Slit
A. Ridge line at slit side on back edge surface
B. Ridge line at downstream side on back edge surface
C. Ridge line at slit side on front edge surface
DA. Ridge line at upstream side on center bar
DB. Ridge line at downstream side on center bar

BACKGROUND OF THE INVENTION

As a coating apparatus, there are known various types such as a roll coater, a gravure coater, an extrusion coater, a slide bead coater and a curtain coater. As a coating apparatus for a magnetic recording medium, however, a roll coater, a gravure coater and an extrusion coater are used widely.

In the case of an extrusion coater, it is easy to obtain uniform coating thickness, but the range of conditions for good coating is narrow, which is a problem. This phenomenon is remarkable in particular in the case of high speed coating such as a coating speed of not less than 200 m/min or in the case of a magnetic coating solution having a high viscosity such as 4000 cp or more.

Coating methods for the foregoing are disclosed in Japanese Patent Publication Open to Public Inspection Nos. 84771/1982, 104666/1983, 238179/1985, 35959/1990, 288364/1989, 210072/1989, 184072/1989 and 162/1991 (hereinafter referred to as Japanese Patent O.P.I. Publication). In these technologies, a sectional shape of a back edge is either a curved surface having a single radius of curvature or a shape having a cutout at the edge of a curved surface.

Figure 3:
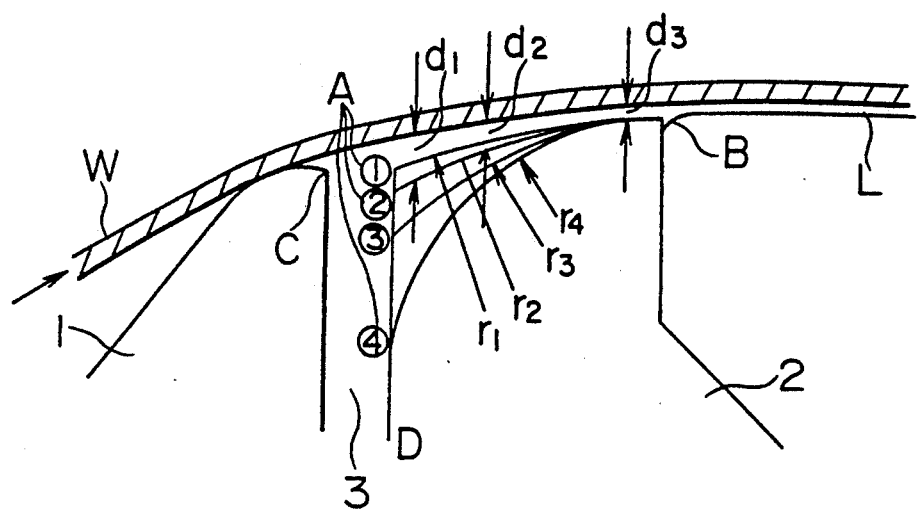
FIG. 3 shows a sectional view of a conventional coating apparatus.

FIG. 3 shows an example of a sectional view of an extrusion coater having a back edge shape of a curved Surface with a single radius of curvature, wherein the numeral 1 is a front edge, 3 is a slit, and 2 is a back edge. When a shape of back edge 2 is represented by only a single radius of curvature $r_1$, $r_2$, $r_3$ or $r_4$, it is difficult to control the distance between web w and back edge 2, that is thickness of a coating solution layer.

In this case, the distance between a back edge surface and a web is represented by $d_1$, $d_2$ or $d_3$ each corresponding to positions moved from the upstream side to the downstream side in that order.

In the case of ② radius of curvature $r_2$, for example, the aforementioned distance varies to be $d_1$, $d_2$ and $d_3$ depending on positions.

In such a case, however, ① radius of curvature $r_1$ gives a small bead at an outlet of a slit because of a narrow gap at an upstream edge on the back edge (edge at a slit side), and thereby the change of speed slope is too great. Therefore, spread of coating solution from the slit to the gap between a web and the back edge can not be smooth, making uniform coating impossible by causing air-drawing, scraping-off and uneven flow of a coating solution.

In the case of ④ radius of curvature $r_4$ of the back edge, $d_1$ is large, and $d_2$ and $d_3$ become small gradually in this order, and therefore the speed slope is gentle. However, most force from a web to the edge are concentrated at the position of $d_3$ or its neighborhood and thereby the coating solution hits strongly at the downstream side on the back edge, making uniform coating impossible by causing scraping-off and disturbed flow of a coating solution.

In the case of ② radius of curvature $r_2$ or ③ radius of curvature $r_3$ of the back edge, the speed slope is between the aforementioned ① and ④ and it is gentle to the desired degree, and force from a web are dispersed to $d_2$ and $d_3$ Therefore, it is easy to coat uniformly. Even in this case, however, when the coating speed is as high as 200 m/min or more and the flow rate is as low as 10 μm or less in terms of wet coating thickness, it is not possible to coat stably.

Figure 4:
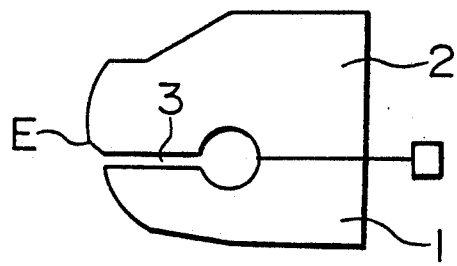
FIG. 4 shows a sectional view of a conventional coating apparatus.

FIG. 4 is a sectional view showing an example of a conventional extrusion coater which is disclosed in Japanese Patent O.P.I. Publication No. 35959/1990. In this example, there is provided a flat area on the curved portion at a slit side on a back bar (doctor edge in the specification). However, uniform coating is still difficult due to scraping-off of coating solution and disturbed flow thereof both caused by force from a web concentrated on edge E, the reasons for which being that the edge E at the downstream side on the flat area is somewhat sharp, a front edge is retreated toward the opposite side of the web and coating is performed while the front edge is kept away from the web (keeping a slight clearance).

As recording density of a magnetic recording medium has been enhanced recently, a multi-layer magnetic recording medium has become popular. Especially, after an extrusion coater capable of coating on a multi-layer basis has been devised, the magnetic recording medium made through the extrusion coater is much more advantageous in cost aspect than a metallic thin layer magnetic recording medium, and electromagnetic converting characteristics of the magnetic recording medium mentioned above have come close to that of the metallic thin layer magnetic recording medium.

On the other hand, to achieve the multi-layer structure, there has been used a method wherein a process of coating the coating solution on a support and drying it is repeated one layer by one layer for obtaining a multi-layer structure, as disclosed in, for example, Japanese Patent O.P.I. Publication Nos. 119204/1976, 51908/1977 and 16604/1978, However, in the method mentioned above, there have been problems of poor productivity due to repetition of the step of coating an drying and of difficulty for obtaining a thin uppermost layer. Manufacturing methods for a magnetic recording medium by means of simultaneous multi-layer coating of a wet-on-wet type are disclosed in Japanese Patent O.P.I. Publication Nos. 98803/1973 and 111168/1986. In both methods, however, the support running continuously being supported on a back roll is coated with a coating solution multi-layered in advance, and uneven coating in the coating direction tends to occur when rotation accuracy of the back roll is insufficient, thereby it has been difficult to manufacture satisfactory magnetic recording media.

On the other hand, another method as disclosed in Japanese Patent O.P.I. Publication No. 124631/1987 is available. In that method, an upper layer can be coated by means of an extrusion coater of a single layer type while the lower layer is wet on the support, without a back roll supporting the support. Even in this case, thickness distribution in both lateral and longitudinal directions can not be satisfactory under the coating condition wherein the thickness of dried coating is 0.3 μm or less.

For solving problems mentioned above, there has been devised a coater head having two slits from which coating solutions are extruded, as disclosed in Japanese Patent O.P.I. Publication No. 88080/1988 and 251265/1990.

Figure 5A:
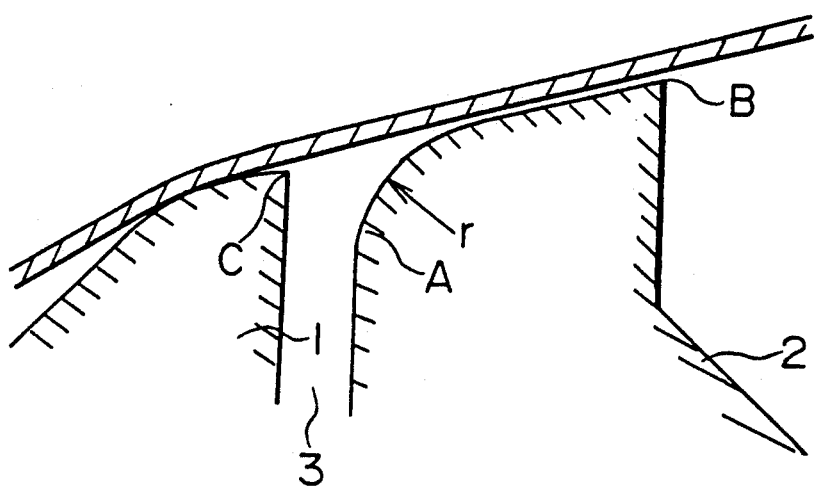
FIG. 5 (a) is a sectional view of a coating apparatus of the invention
Figure 5B:
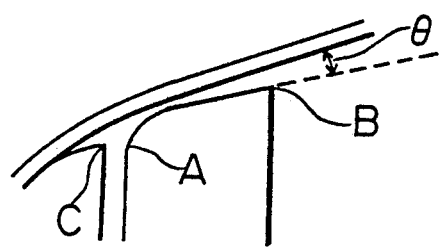
Figure 5C:
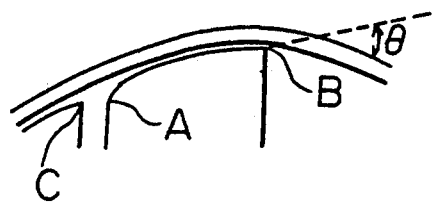

A coater head from which two coating solutions are extruded is naturally composed of three portions such as a front bar, a center bar and a back bar as shown in FIG. 5. When a coater of this type is used, an important factor for determining coating capability for simultaneous multi-layer coating is a sectional shape of a portion of the aforementioned bar where it touches the coating solution or it touches the support running continuously.

Figure 6:
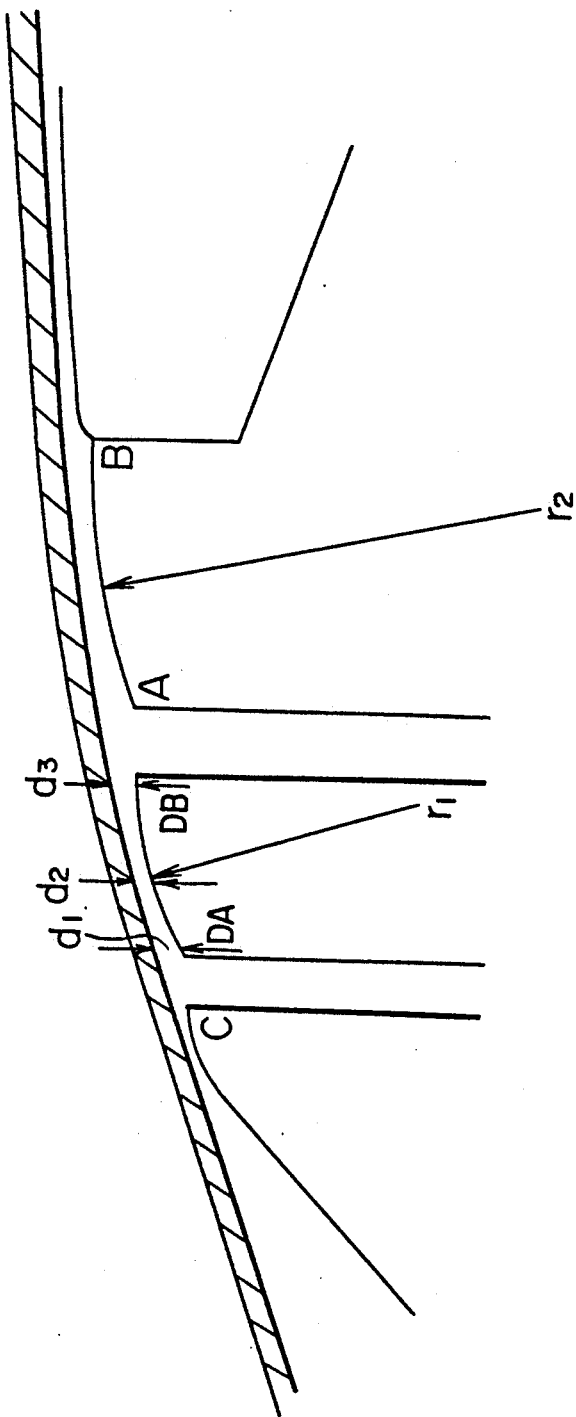
FIG. 6 represents conventional type surface-edges having each a single curve.

In conventional technology, each of a sectional shape of a center bar and that of a back bar has basically been composed of a single radius of curvature. As shown in FIG. 6, therefore, it is important that the relation of $d_1 > d_2 > d_3$ can be maintained ideally when distances between the support and the center bar are represented by $d_1$, $d_2$ and $d_3$. This means, as stated previously, that the velocity radient of the support and coating solution is made gentle. However, the technology disclosed currently can not eliminate a partial reverse-flow phenomenon shown in the figure, thereby, there has not been established a coating method for a coated type magnetic recording medium with a thin multi-layer structure having excellent electro-magnetic conversion characteristics and less coating troubles.

SUMMARY OF THE INVENTION

For the problems mentioned above, an object of the invention is to provide a coating method and a coating apparatus both suitable for making at high speed a magnetic recording medium with uniform coating of thin multi-layer or single layer, especially the one excellent in electro-magnetic conversion characteristics.

When using a coating apparatus having a single slit, the object of the invention mentioned above can be achieved by a coating apparatus comprising a front bar located at the upstream side of a flexible support running continuously, a back bar located at the downstream side, and a slit formed between the front bar and the back bar from which a coating solution is pushed out continuously for coating on the surface of said support. Origin A is at the intersection of the upstream end point of the first arc, whose radius is $r_1$, and the straight line which defines the back surface of the slit; point C is the downstream end point of the front edge surface. A straight line connecting these two points is the X coordinate axis and the direction toward the downstream end point on the back edge surface is defined as the positive direction. A straight line perpendicular to the X coordinate axis, which passes through origin A, is the Y coordinate axis and the direction toward the support is defined as the positive direction. The downstream end point on the back edge surface is point B, and the shape of a section of the back edge surface satisfies the expressions $$y = a(x/L_b)^n;$$

$$0.1 \leq a \leq 1.0;$$

$$0.1 \leq n \leq 0.7;$$

$$0.2 \leq L_b \leq 5.0 \text{ mm}$$

wherein $L_b$ is the projected length of the back edge surface on the X coordinate axis. Additionally, at least one part of the section of the back bar protrudes from a tangent line at point C.

In this case, it is preferable to coat under the conditions that angle θ formed by a tangent line at point B which is the downstream end point on the back edge surface and a flexible support located on the downstream side from the point B satisfies the relation of $-10° \leq θ \leq 30°$ and the downstream end point on the back edge surface touches the surface of coating solution.

The object of the invention mentioned above can also be achieved by a coating apparatus comprising a front bar located at the upstream side of a flexible support running continuously, a back bar located at the downstream side, and a slit formed between the front bar and the back bar from which a coating solution is pushed out continuously for coating on the surface of said support. Origin A is at the intersection of the upstream end point of the first arc, whose radius is $r_1$, and the straight line which defines the back surface of the slit; point C is the end point of the front edge surface. A straight line connecting these two points is the X coordinate axis and the direction toward the downstream end point on the back edge surface is defined as the positive direction. A straight line perpendicular to the X coordinate axis, which passes through origin A, is the Y coordinate axis and the direction toward the support is defined as the The downstream end point on the back edge surface is point B; curved line $L_c$ connects origin A and point B to form the shape of the section of the back edge surface having thereon point $b_1$ and point $b_2$. The projections of these points on the X coordinate axis are $X_1$ and $X_2$, respectively. The projection point of point B on the Y coordinate axis is $H_b$ and the projection point thereof on the X coordinate axis is $L_b$.

The portion from point A to point $b_1$ on curved line $L_c$ is an arc whose radius is $r_1$; the value of the projected point of the center of the arc on the Y coordinate axis being smaller than that for point A. The portion from point $b_1$ to $b_2$ on line $L_c$ is an arc whose radius is $r_2$ and the value of the projected point of its center on the Y coordinate axis is smaller than that of the projected point of the point $b_1$ on the Y coordinate axis. The portion from $b_2$ to point B is an arc whose radius is $r_3$ and the value of the projected point of its center on the Y coordinate axis is smaller than that of the projected point of $b_2$ on the Y coordinate axis. Angles $\theta_1$ and $\theta_2$, formed by extensions of tangent lines at the meeting point of the arcs containing points $b_1$ and $b_2$, are equal to or smaller than 5°, and at least one part of the section of the back bar protrudes from the tangent line at point C. The values of $X_1$, $X_2$, $L_b$, $H_b$, $r_1$, $r_2$, and $r_3$ mentioned above satisfy the following expressions:

$$0.2 \leq L_b \leq 5.0 \text{ (mm)}$$

$$0 \leq X_1/L_b \leq 0.5$$

$$0.2 \leq X_2/L_b \leq 0.8$$

$$-0.5 \leq H_b/L_b \leq 0.5$$

$$0.05 \leq r_1 \leq 2.0 \text{ mm}$$

$$0.5 \leq r_2 \leq 5.0 \text{ mm}$$

$$6.0 \leq r_3 \leq 30.0 \text{ mm}$$

$$X_1 < r_1, X_2 - X_1 < r_2, L_b - X_2 < r_3.$$

The object mentioned above can further be achieved by the coating apparatus wherein a portion from point $b_2$ to point B is a straight line and values of $X_1$, $X_2$, $L_b$, $H_b$, $r_1$ and $r_2$ satisfy the following expressions;

$$0.2 \leq L_b \leq 5.0 \text{ (mm)}$$

$$0 \leq X_1/L_b \leq 0.5$$

$$0.2 \leq X_2/L_b \leq 0.8$$

$$-0.5 \leq H_b/L_b \leq 0.5$$

$$0.05 \leq r_1 \leq 5.0 \text{ mm}$$

$$6.00 \leq r_2 \leq 30 \text{ mm}$$

$$X_1 < r_1, X_2 - X_1 < r_2.$$

Even in the case of the aforementioned two types of coating apparatuses, it is preferable to coat under the conditions that angle $\theta$ formed by a tangent line at point B which is the downstream end point on the back edge surface and a flexible support located at the downstream side from the point B satisfies the relation of $-10° \leq \theta \leq 30°$ and the downstream end point on the back edge surface touches the surface of coating solution.

When using a coating apparatus having two slits, the object of the invention mentioned above can be achieved by a coating apparatus comprising a front bar, a center bar, a back bar, a first slit formed between the front bar and the center bar, and a second slit formed between the center and the back bar. Both slits push out coating solution continuously toward the surface of the flexible support running continuously along the surfaces of the front edge, the center edge, and the back edge. The upstream end point on the center edge surface, which is a terminal point at the back bar side on the first slit, is origin CA, the downstream end point of the front edge surface is point C, the straight line connecting these two points is the X1 coordinate axis, and the direction toward the downstream end point on the center bar is defined as the positive direction. The straight line perpendicular to the X1 coordinate axis passing through origin CA is the Y1 coordinate axis and the direction toward the support is the positive direction. Point B is at the downstream end point of the center edge surface.

Curved line $CL_c$ connects origin CA and point B to form the shape of a section of the center edge surface having thereon point $b_1$ and point $b_2$. The projected points on the X1 coordinate axis of $b_1$ and $b_2$ are $X_1$ and $X_2$; the projected point of point B on the Y1 coordinate axis is $H_c$ and the projected point thereof on the X1 coordinate axis is $L_c$. The portion from point CA to point $b_1$ on curved line $CL_c$ is an arc whose radius is $r_1$ and the value of the projected point of the center of the arc on the Y1 coordinate axis is smaller than that of point CA.

The portion from points $b_1$ to $b_2$ is an arc whose radius is $r_2$ and the value of the projected point of its center on the Y1 coordinate axis is smaller than that of the projected point of point $b_1$ on the same axis. The portion from $b_2$ to point B is an arc whose radius is $r_3$ and the value of the projected point of its center on the Y1 coordinate axis is smaller than that of the projected point of $b_2$ on that axis. Angles $\theta_1$ and $\theta_2$, formed by extensions of tangent lines at the meeting point of arcs $b_1$ and $b_2$, are equal to or smaller than 5°.

Origin BA is at the intersection of the upstream end point of the arc, whose radius is $r_4$, and the straight line which defines the back surface of the second slit. The straight line connecting origin BA and point B, which is a downstream end point on the center edge surface, is an X2 coordinate axis and the direction toward the downstream end point on the back bar is the positive direction. The straight line perpendicular to the X2 coordinate axis passing through origin BA is the Y2 coordinate axis, and the direction toward the support is the positive direction. The downstream end point on the back edge surface is point D, and curved line $BL_c$ connects origin BA with point D to form the shape of a section of the back edge surface. Points $b_3$ and $b_4$ are located thereon and their projected points on the X2 coordinate axis are $X_3$ and $X_4$. The projected point of point D on the Y2 coordinate axis is $H_b$ and the projected point thereof on the X2 coordinate axis is $L_b$.

The portion from point BA to point $b_3$ on curved line $BL_c$ is an arc whose radius is $r_4$, and the value of the projected point of the center of the arc on the Y2 coordinate axis is smaller than that for point BA. The portion from point $b_3$ to $b_4$ thereof is an arc whose radius is $r_5$, and the value of the projected point of its center on the Y2 coordinate axis is smaller than that of the projected point of point $b_3$. The portion from $b_4$ to point D is an arc whose radius is $r_6$ and the value of the projected point of its center on the Y2 coordinate axis is smaller than that of the projected point of $b_4$ on the same axis.

Angles $\theta_3$ and $\theta_4$, formed by extensions of tangent lines at the meeting point of the arcs containing $b_3$ and $b_4$, are equal to or smaller than 5°. The foregoing satisfy the following expressions:

$$0.1 \leq L_c \leq 5.0 \text{ (mm)}$$

$$0 \leq X_1/L_c \leq 0.5$$

$$0.2 \leq X_2/L_c \leq 0.8$$

$$0 \leq H_c/L_c \leq 0.5$$

$$0.05 \leq r_1 \leq 1.0 \text{ mm}$$

$$0.5 \leq r_2 \leq 5.0 \text{ mm}$$

$$6.0 \leq r_3 \leq 30.0 \text{ mm}$$

$$0.2 \leq L_b \leq 5.0 \text{ (mm)}$$

$$0 \leq X_3/L_b \leq 0.5$$

$$0.2 \leq X_4/L_b \leq 0.8$$

$$0 \leq H_c/L_b \leq 0.5$$

$$0.05 \leq r_4 \leq 5.0 \text{ mm}$$

$$6.0 \leq r_5 \leq 15.0 \text{ mm}$$

$$10.0 \leq r_6 \leq 30.0 \text{ mm}$$

$$X_1 < r_1, X_2 - X_1 < r_2, L_c - X_2 < r_3$$

$$X_3 < r_4, X_4 - X_3 < r_5, L_b - X_4 < r_6.$$

In this case, it is preferable to coat under the conditions that angle $\theta$ formed by a tangent line at point D which is the downstream end point on the back edge surface and a flexible support located on the downstream side from the B satisfies the relation of $-10° \leq \theta \leq 30°$ and the downstream end point on the back edge surface touches the surface of coating solution.

DETAILED DESCRIPTION OF THE INVENTION

The invention will be explained in detail as follows.

The most important factor on which the coatability of an extrusion coater and the characteristics of the coated surface depend is a shape of an edge surface, after all is considered. The shape, in this case, means a shape of a portion on a front bar that is in contact with or is most closest to a running support, a shape of a portion on a back bar that is in contact with a coating solution, and relation between both shapes mentioned above. Among them, when coating a coating solution wherein extremely fine powder is dispersed, viscosity characteristic thereof is deviated considerably from that of Newton fluid and plastic flow properties are shown. Namely, when the coating solution is receiving an extremely weak external force (shear rate of 10 sec$^{-1}$ or less), the viscosity is high, while when it is receiving a strong force (shear rate of 10$^4$ sec$^{-1}$ or more), the viscosity is low. For obtaining excellent coatability and uniformity on the coated surface, therefore, it is necessary that a coating solution is accelerated on the back edge surface gradually and extremely smoothly, and it is more necessary especially when the coating speed is high (300 m/min or more). The relation between the front bar and the back bar is also important for the excellent coatability and uniformity of the coated surface which are also closely connected to the shape of the back bar.

For the improvement in the aspects mentioned above, the invention has cleared the new shape of a back bar and a position of a front bar.

Figure 1:
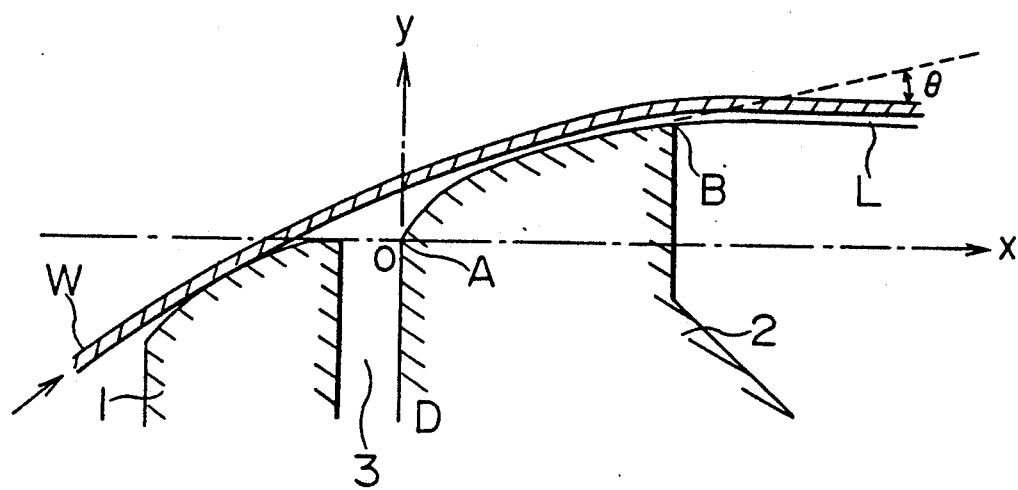
FIG. 1 shows a sectional view of a coating apparatus of the invention.

FIG. 1 is a sectional view showing an example of a coating apparatus of the invention. Namely, it is a coating apparatus described in the aforementioned Structure (1) of the invention. With regard to the shape of a section of the back edge surface in the figure, it is represented by a curve satisfying $y = a(x/L_b)^n$, $0.1 \leq a \leq 1.0$, $0.1 \leq n \leq 0.7$ on a plane of X coordinate axis having an origin at point A that is the upstream end point on the back edge surface and passing point C that is the downstream end point on the front edge and of Y coordinate axis that is perpendicular to the X coordinate axis, and a part of the curve mentioned above is protruded from a tangent line on the point C that is the downstream end point on the front bar. In this case, $L_b$ represents a length of the back edge surface projected on the X coordinate axis and it is within a range of $0.2 \leq L_b \leq 5.0$ mm.

In the foregoing, the reason why the X coordinate axis passes through the point C that is the downstream end point on the front bar and the point A that is the upstream end point on the back bar is that the present inventors found, after their intensive study, that the optimum shape of the back bar depends on the positional relation with the front bar and intended to clear the edge shape considering the results of their study. Owing to the invention, efficiency has been remarkably improved. In the past, the shape of the back edge surface and the optimum positional relation of the front bar were not clear, and when developing a new coating apparatus, a new back edge surface was formed first and tests were made while adjusting its relational position with a front bar.

By making the shape of a back bar to be an extremely smooth curve while clearing the positional relation, extremely satisfactory results were obtained in the case of high speed thin layer coating which was difficult in the past. For example, coating at the coating speed of 500 m/min or more for the thin layer whose thickness of wet coating is 10$\mu$ was realized for the first time.

Owing to the foregoing, under the conditions mentioned above, it has become possible to manufacture a magnetic recording medium wherein coating unevenness is extremely low (yield of 99% or more).

When increasing the coating speed, it is preferable that the length of the back edge surface projected on X coordinate axis is short, to be concrete, 3 mm or less. The angle formed by X coordinate axis and a slit between a front bar and a back bar can actually be within a range from $-10°$ to $+30°$, it is preferably within a range from $-10°$ to $+20°$ when maintenance of mechanical accuracy of a coating apparatus and a broad range of conditions for achieving excellent coatability are taken into consideration.

Figure 2A:
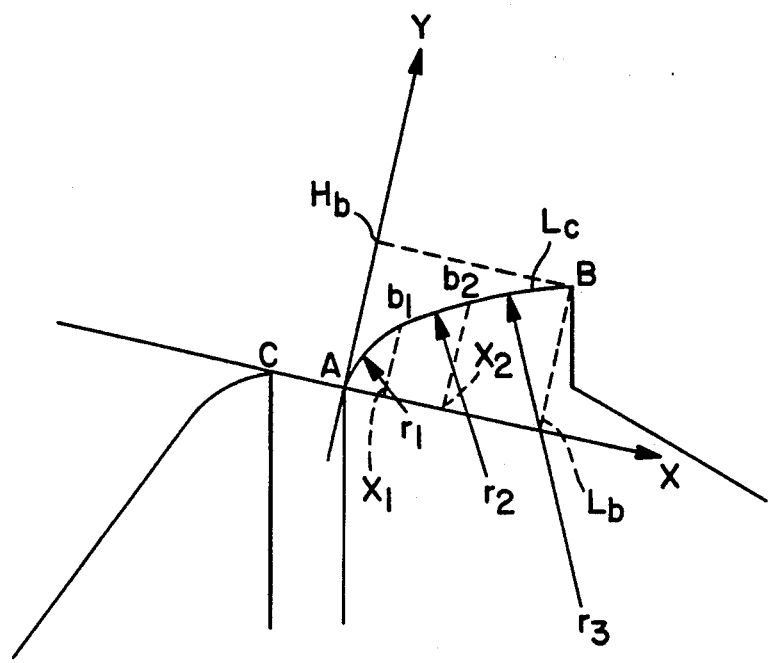
FIG. 2 a, b shows a sectional view of a coating apparatus of the invention.
Figure 2B:
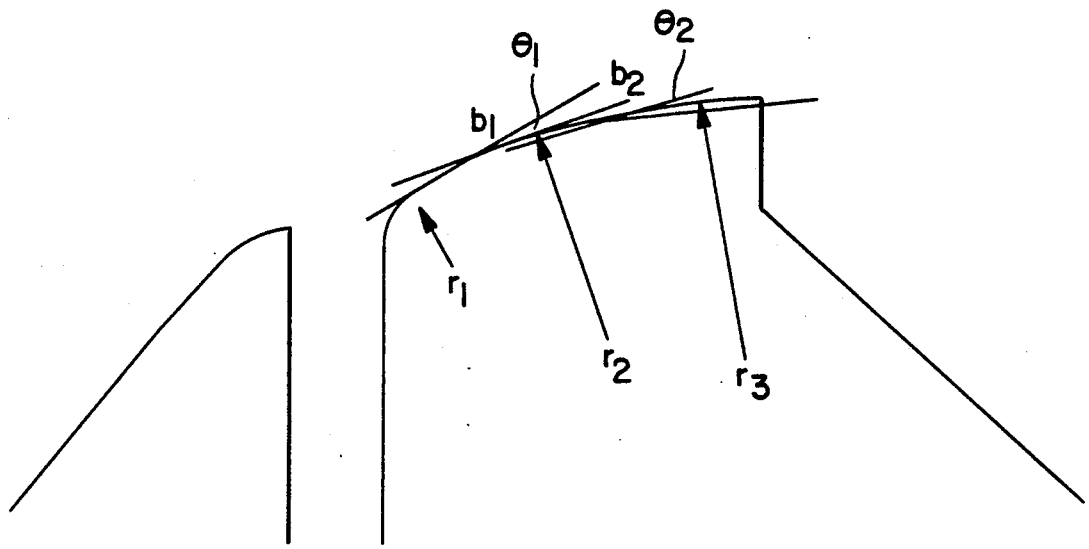

FIG. 2 is a sectional view showing an example of a coating apparatus of the invention. Namely, it is a coating apparatus described in the aforementioned Structure (2) of the invention. In a word, on XY coordinates wherein an X coordinate axis whose origin is the upstream end point on the back edge surface passes through point C that is the downstream end point on the front edge surface, it is necessary that an angle or angles formed by tangent lines at connecting points for two or three different curves may show 5° or less, and values of parameters representing each shape satisfy the following relations.

$$0.2 \leq L_b \leq 5.0 \text{ (mm)}$$

$$0 \leq X_1/L_b \leq 0.5$$

$$0.2 \leq X_2/L_b \leq 0.8$$

$$-0.5 \leq H_b/L_b \leq 0.5$$

$$0.05 \leq r_1 \leq 2.0 \text{ mm}$$

$$0.5 \leq r_2 \leq 5.0 \text{ mm}$$

$$6.0 \leq r_3 \leq 30.0 \text{ mm}$$

$$X_1 < r_1, \ X_2 - X_1 < r_2, \ L_b - X_2 < r_3$$

In the foregoing, the reason why the X coordinate axis passes through the point C that is the downstream end point on the front bar and the point A that is the upstream end point on the back bar is that the present inventors found, after their intensive study, that the optimum shape of the back bar depends on the positional relation with the front bar and intended to clear the edge shape considering the results of their study. Owing to the invention, efficiency has been remarkably improved. In the past, the shape of the back edge surface and the optimum positional relation of the front bar were not clear, and when developing a new coating apparatus, a new back edge surface was formed first and tests were made while adjusting its relational position with a front bar.

By making the shape of a back bar to be an extremely smooth curve while clearing the positional relation, the coatability in high speed coating has been sharply improved. For example, coating at the coating speed of 500 m/min or more for the thin layer whose thickness of wet coating is 10μ was realized for the first time.

It is assumed that the reason for the foregoing achievement is that an optimum velocity gradient of a coating solution is formed between the edge surface and the support by the shape of the back edge surface having a plurality of curvatures. Especially when the particle size of magnetic powder is small (0.15μ or less in length of the major axis) as in metallic magnetic powder, the fluidity of a coating solution shows complicated characteristics. In that case, the shape of the back edge surface mentioned above is effective in particular.

Owing to the foregoing, it has become possible to manufacture a magnetic recording medium having extremely low unevenness in coating (yield of 99% or more) under the conditions mentioned above.

In this case, in particular, it is preferable that radii of curvature of the curve having two or three curvatures are determined so that they show larger values as they approach the downstream end point from the upstream end point on the back edge surface as shown in the following inequality.

$$2r_1 \leq r_2 \leq \tfrac{1}{2} r_3$$

It is preferable that the higher the coating speed is, the shorter the length of the back edge surface projected on the X coordinate axis represented by Lb is. To be concrete, the length of 3 mm or less is preferable. The machining accuracy for the back edge surface that is equal to or inferior to 0.5 mm is not preferable because it causes uneven distribution of layer thickness in the lateral direction.

It is further preferable that $H_b/L_b$ that is a ratio of a value of the point of height of the back edge represented on the Y coordinate axis to a value of the same point of height represented on the X coordinate axis is within a range from −0.5 to +0.5, and it is more preferable, when the coating speed is extremely high, that the ratio is within a range from 0 to about 0.4.

It is preferable that an angle formed at each curve-connecting point on the the curve having a plurality of curvatures is 1 or less, when possible occurrence of a coating trouble is taken into consideration.

Further, due to the sectional shape of a portion of the back edge surface located at the downstream part consisting of a straight line as shown in a plurality of drawings in FIG. 5 mentioned above, the machining accuracy for the back edge surface has been improved, and it has become possible to manufacture a magnetic recording medium that shows fairly good electro-magnetic conversion characteristics in the range of coating speed up to 600 m/min for the thickness of dried coating of 10μ or more. The reason for the above is that characteristics of the coated surface depend primarily on a state of the surface of the back edge located in the vicinity of the downstream end point. When the sectional shape of the entire back edge surface from the upstream end to the downstream end is composed of curves, an upper limit for complying with thin layer coating and high speed coating can be enhanced. However, for the above reason, a straight line at the downstream portion on the back edge surface has become possible to provide merits on two aspects with regard to the characteristics of the coated surface.

Even in the case of a coating apparatus wherein a downstream portion is composed of a straight line, it is preferable that the higher the coating speed is, the shorter the length of the back edge surface projected on the X coordinate axis represented by Lb is. To be concrete, the length of 3 mm or less is preferable. The machining accuracy for the back edge surface that is equal to or inferior to 0.5 mm is not preferable because it causes uneven distribution of layer thickness in the lateral direction.

It is further preferable that $H_b/L_b$ that is a ratio of a value of the point of height of the back edge represented on the Y coordinate axis to a value of the same point of height represented on the X coordinate axis is within a range from −0.5 to +0.5, and it is more preferable, when the coating speed is extremely high, that the ratio is within a range from 0 to about 0.4.

It is preferable that an angle formed at each curve-connecting point on the the curve having a plurality of curvatures is 1° or less, when possible occurrence of a coating trouble is taken into consideration.

A coating apparatus having a single slit of the invention has been explained concretely above, and an important and preferable condition for actual coating is that angle θ formed by a tangent line at the downstream end point on the back edge surface and a base (See FIG. 5.) is within a range from −10°−+30° for coating and a more preferable condition is that the angle is within a range from −5° to +10°. For the shape of the back edge surface mentioned above, various shapes of a front bar may also be used, and the preferable is one wherein a straight line portion that is 1 mm or less long is provided at the downstream portion on the front bar, or the one wherein a curve whose radius of curvature is not more than 20 mm and not less than 1 mm is provided at the downstream end portion. Even for the flexible support running continuously and having thickness of $50\mu$ or more whose stiffness is comparatively high, the coatability for that is not deteriorated.

With regard to the viscosity of a coating solution, those from 0.1 cps to about 10000 cps indicated when measured by a viscometer of a B type are sufficiently acceptable, but the the range from 50 cps to 4000 cps indicated when measured by a viscometer of a B type, or the range from 10 cps to 200 cps at the rate of shear of 3000 sec$^{-1}$ indicated when measured by a viscometer that is fit for the high rate of shear is preferable from the viewpoint of coatability.

The coating apparatus of the invention shows excellent coatability in wet-on-wet coating. Especially in that case, it is preferable that the viscosity of the coating solution to be applied to the wet layer be low; specifically, it is most desirable that it be half that of the under layer as determined on a viscometer of the B type.

Even in the case wherein the aforementioned single slit is composed on its half way of a plurality of slits and a plurality of kinds of coating solutions are coated on a support in a perfectly multi-layered state, a coating apparatus of the invention can offer extremely excellent coating.

Next, a coating apparatus having a front bar, a center bar, a back bar, and two slits will be explained concretely as follows.

Figure 7:
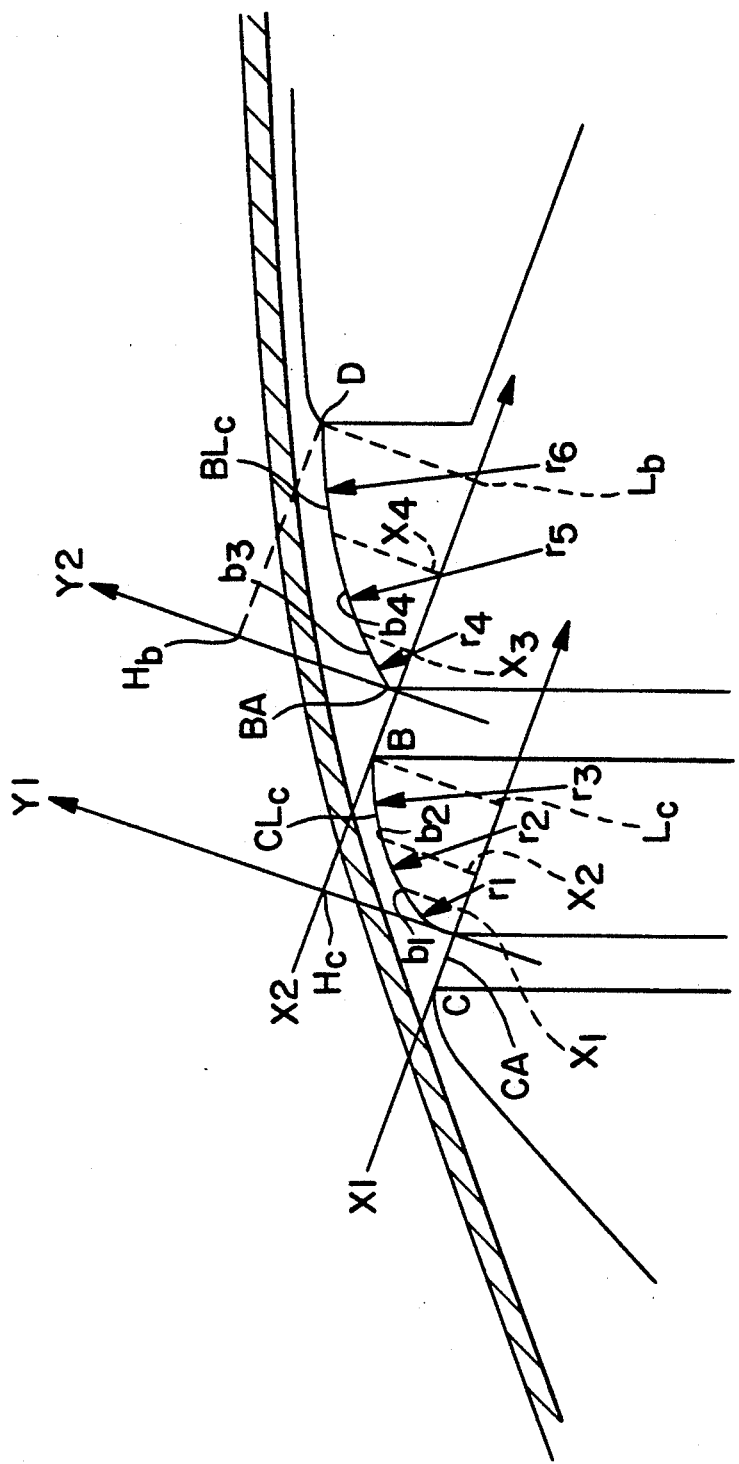
FIG. 7 represents coordinates X1, Y1 and X2, Y2.
Figure 8:
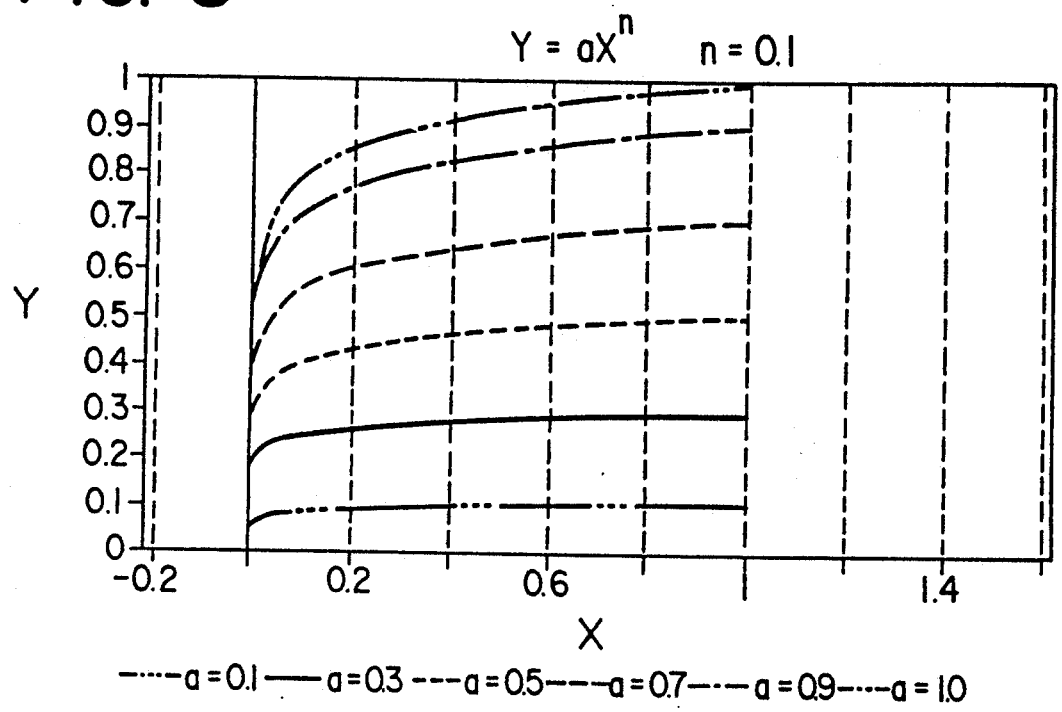
FIGS. 8-10 represent graphs showing curved surfaces on the back bar of the coating apparatus.
Figure 9:
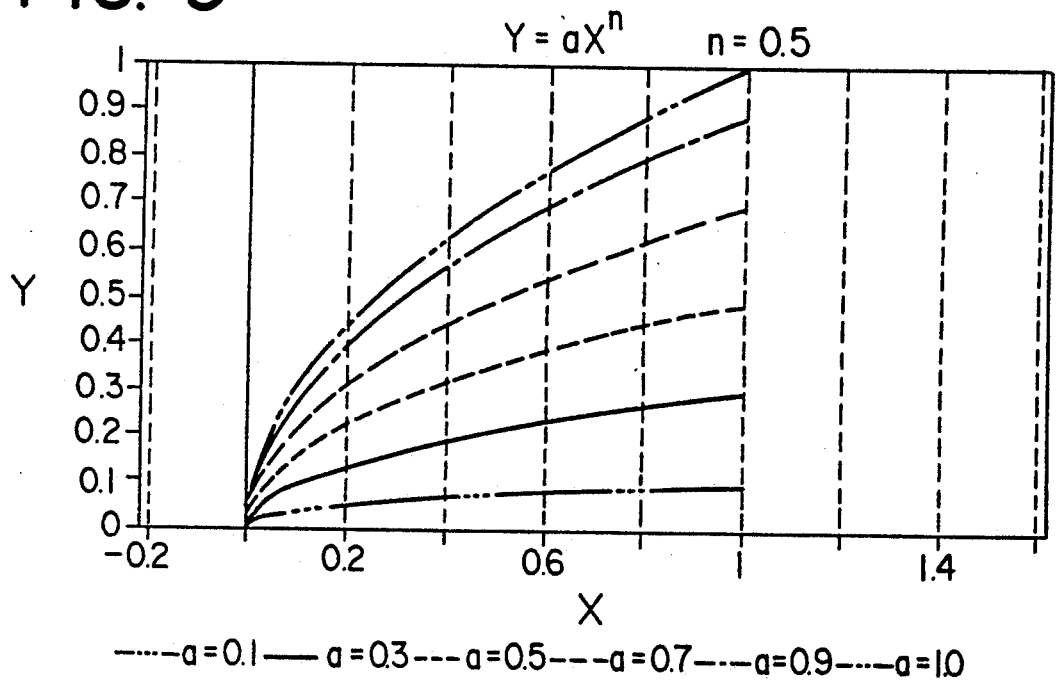
Figure 10:
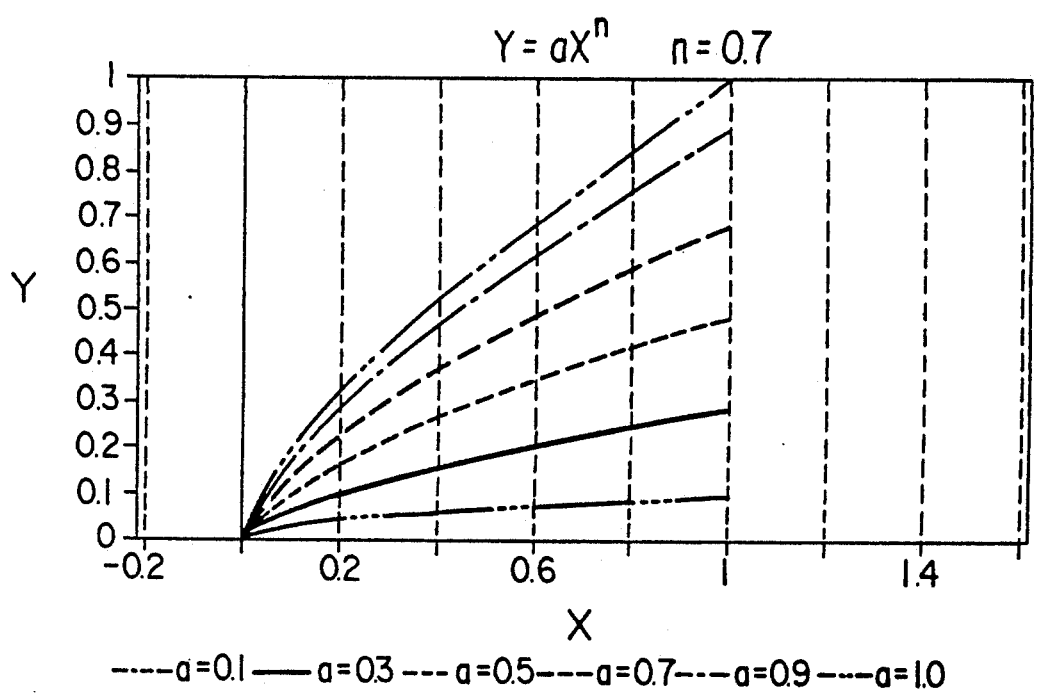
Figure 11:
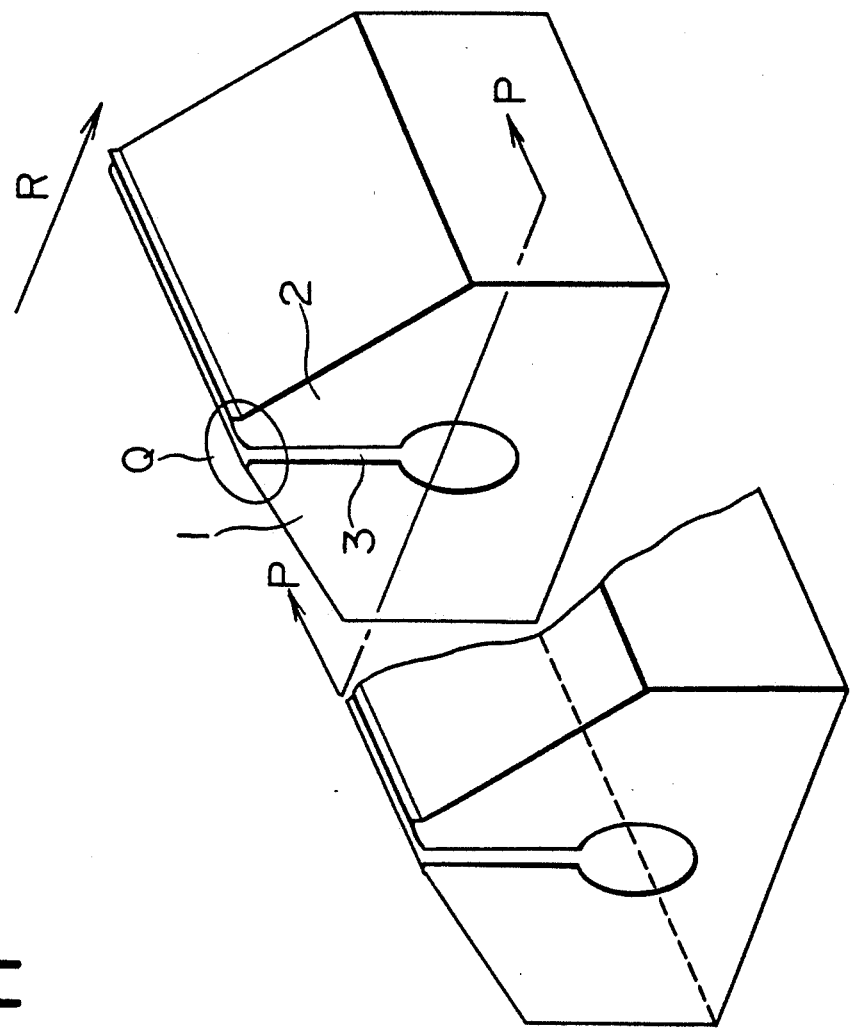
FIG. 11 shows a whole block of the coater; arrow P indicates direction of cross-sectional view and arrow R indicates the direction of the flexible support running.

The coating apparatus is one explained in Structure (3) of the invention, and its sectional view is shown in FIG. 7.

The coating apparatus is one wherein, when an upstream end point on the center edge surface which is a terminal point at the back bar side on the first slit is defined as origin CA, a downstream end point of the front edge surface is defined as point C, a straight line connecting said two points is an X1 coordinate axis and a direction toward the downstream end point on the center bar is defined as a positive direction, and a straight line that is perpendicular to the X1 coordinate axis and passes through the origin CA is defined as a Y1 coordinate axis and its direction toward the support is defined as a positive direction and a downstream end point on the center edge surface is defined as point B, and when curved line CL$_c$ connecting the origin CA and the point B both form the shape of a section of the center edge surface has thereon point b$_1$ and point b$_2$ whose projected points on the X1 coordinate axis are defined as X$_1$ and X$_2$ and a projected point of the point B on the Y1 coordinate axis is defined as H$_c$ while the projected point thereof on the X1 coordinate axis is defined as L$_c$, a portion from point CA to point b$_1$ on the curved line CL$_c$ is an arc whose radius is r$_1$ and the value of the projected point of the center of the arc on the Y1 coordinate axis is smaller than that for the point CA while the portion from point b$_1$ to b$_2$ thereof is an arc whose radius is r$_2$ and the value of the projected point of its center on the Y1 coordinate axis is smaller than that of the projected point of the point b$_1$ on the Y1 coordinate axis, again, a portion from b$_2$ to point B is an arc whose radius is r$_3$ and the value of the projected point of its center on the Y1 coordinate axis is smaller than that of the projected point of b$_2$ on the Y1 coordinate axis, angles $\theta_1$ and $\theta_2$ formed by extensions of tangent lines at connecting point of arcs b$_1$ and b$_2$ are equal to or smaller than 5° and when an upstream end point on the back edge surface which is a terminal point at the back bar side on the second slit is defined as origin BA, a straight line connecting the origin BA and point B that is a downstream end point on the center edge surface is an X2 coordinate axis and a direction toward the downstream end point on the back bar is defined as a positive direction, and a straight line that is perpendicular to the X2 coordinate axis and passes through the origin BA is defined as a Y2 coordinate axis and its direction toward the support is defined as a positive direction and a downstream end point on the back edge surface is defined as point D, and when curved line BL$_c$ connecting the origin BA and the point D both form the shape of a section of the back edge surface has thereon point b$_3$ and point b$_4$ whose projected points on the X2 coordinate axis are defined as X$_3$ and X$_4$ and a projected point of the point D on the Y2 coordinate axis is defined as H$_b$ while the projected point thereof on the X2 coordinate axis is defined as L$_b$, a portion from point BA to point b$_3$ on the curved line BL$_c$ is an arc whose radius is r$_4$ and the value of the projected point of the center of the arc on the Y2 coordinate axis is smaller than that for the point BA while the portion from point b$_3$ to b$_4$ thereof is an arc whose radius is r$_5$ and the value of the projected point of its center on the Y2 coordinate axis is smaller than that of the projected point of the point b$_3$ on the Y2 coordinate axis, again, a portion from b$_4$ to point D is an arc whose radius is r$_6$ and the value of the projected point of its center on the Y2 coordinate axis is smaller than that of the projected point of b$_4$ on the Y2 coordinate axis, angles $\theta_3$ and $\theta_4$ formed by extensions of tangent lines at connecting point of arcs b$_3$ and b$_4$ are equal to or smaller than 5°, and the parameter values satisfy the following relations.

$0.1 \leq Lc \leq 5.0$ (mm)

$0 \leq X_1/Lc \leq 0.5$ $0.2 \leq X_2/Lc \leq 0.8$ $0 \leq Hc/Lc \leq 0.5$ $0.05 \leq r_1 \leq 1.0$ mm $0.5 \leq r_2 \leq 5.0$ mm $6.0 \leq r_3 \leq 30.0$ mm $0.2 \leq Lb \leq 5.0$ (mm)

$0 \leq X_3/Lb \leq 0.5$ $0.2 \leq X_4/Lb \leq 0.8$ $0 \leq Hc/Lb \leq 0.5$ $0.05 \leq r_4 \leq 5.0$ mm $6.0 \leq r_5 \leq 15.0$ mm $10.0 \leq r_6 \leq 30.0$ mm $X_1 < r_1$, $X_2 - X_1 < r_2$, $Lc - X_2 < r_3$ $X_3 < r_4$, $X_4 - X_3 < r_5$, $Lb - X_4 < r_6$.

In this case, the reason why the X1 coordinate axis is represented by a line connecting point C that is the downstream end point on the front bar to point CA that is the upstream end point on the ceneer bar, and the X2 coordinate axis is represented by a line connecting point BA that is the upstream end point on the back bar to point B that is the downstream end point on the center bar, is because the present inventors found, after their intensive study, that the three bars mentioned above are closely connected in terms of position and the sectional shape of each of the center bar and the back bar changes when the position of each bar changes as in the case of a coating apparatus having a single slit mentioned above. Owing to this, decision of the shape of edge surface has been improved remarkably as in the case of a coating apparatus having a single slit.

By using a coordinate system such as those described above, it has become possible to overcome inconvenience in the prior art disclosed in Japanese Patent O.P.I. Publication No. 88080/1988 that that actual measuring accuracy can not be assured when the shape of an edge surface is determined by the angle formed by tangent lines on each edge surface. Namely, it has become possible to manufacture a coating apparatus whose reproducibility is very high in production, by clarifying the coordinate axes for the sectional shape of the edge surface and stipulating the curve on the coordinate axes for the sectional shape of the edge surface.

With regard to the actual coatability, each of the center bar and the back bar is composed of a curve having a plurality of curvatures such as two or three curvatures and thereby an optimum velocity gradient for a coating solution that is in parallel with the running direction of a support can be obtained for both the center bar and the back bar. Especially when the rate of shear is fairly high (for example, the rate of shear of $10^6$) and coating solutions each having high viscosity of 50 cps or more are coated simultaneously at high speed on a thin layer basis (for example, the thickness of wet coating for the upper layer is $3\mu$ or less and that for the lower layer is $10\mu$ or less and coating speed is 500 m/min or more), the effect is remarkable.

Further, by using the shapes of the center edge surface and the back edge surface mentioned above, it is possible to keep the high uniformity in layer thickness distribution on the upper layer, while it is naturally improve the coatability in high speed coating of thin layers.

These advantages are specific characteristics which are precious these days because the layer thickness distribution on the upper layer of a multi-layer recording medium has become a very important factor due to a short wavelength for recording caused by a demand for sudden increase of recording density in a magnetic recording medium. Namely, in the example of a video tape, the layer thickness variation leads to the variation of RF output that is most important in electro-magnetic conversion characteristics, and the variation of RF output can be a serious defect because it is confirmed clearly on a monitor through visual observation.

When the coating speed is high, it is preferable that both Lc and Lb are short and it is actually preferable that both are not more than 3 mm but are not less than 0.3 mm from the viewpoint of accuracy for machining the edge surface.

An important and preferable condition for the actual coating is that angle $\theta$ formed by a tangent line at the downstream end point on the back edge surface and a base is within a range from $-10°$ to $+30°$ for coating. It is more preferable that the angle is within a range from $-5°$ to $+10°$ for coating, For the shapes of the back edge surface and the center edge surface mentioned above, various shapes of a front bar may also be used, and the preferable is one wherein a straight line portion that is 1 mm or less long is provided at the downstream portion on the front bar, or the one wherein a curve whose radius of curvature is not more than 20 mm and not less than 1 mm is provided at the downstream end portion. Even for the flexible support running continuously and having thickness of $50\mu$ or more whose stiffness is comparatively high, the coatability for that is not deteriorated.

FIG. 6 is a sectional view showing an example of a conventional coating apparatus. In this example, each of a center edge surface and a back edge surface is composed of a single radius of curvature.

FIG. 3 is a sectional view showing an example of a coating apparatus according to the prior art. In this case, the shape of a section of a back edge is represented by a single radius of curvature.

FIG. 4 is a sectional view showing an example of a coating apparatus of the invention. In this case, a flat portion is provided at the slit side on a curved surface of the back edge.

As magnetic powder to be used for magnetic coating constituting a magnetic recording medium of the invention may include ferromagnetic iron oxide, ferromagnetic chromium dioxide, ferromagnetic alloy powder and others.

Bivalent metal may be added to ferromagnetic iron oxide. The bivalent metal may include Cr, Mn, Co, Ni or the like.

Ferromagnetic chromium dioxide to be used may include $CrO_2$ and those wherein metal such as Na, Fe. Mn or the like, semiconductor such as P or the like or an oxide of those metals are added to $CrO_2$.

Ferromagnetic alloy powder contains not less than 75 wt. % of metal wherein 80 wt. % or more is at least one kind of ferromagnetic metal (e.g. Fe, Co, Ni, Fe—Co, Fe—Ni, Co—Ni, Fe—Co—Ni etc.)

It is also possible to use barium ferrite of a tabular type and magnetic powder wherein a part of Fe atom of the barium ferrite is substituted by an atom such as Ti, Co, Zn or V.

A binder to be used for magnetic coating constituting a magnetic recording medium of the invention may include thermoplastic resins, thermosetting resins, or reactive resins and mixtures thereof.

For example, thermoplastic resins include polyvinyl chloride, co-polymer of vinylchloride and vinyl acetate, co-polymer of vinyl chloride and acrylonitrile, co-polymer of acrylic acid ester and acrylonitrile, co-polymer of acrylic acid ester and vinylidene chloride, urethane elastomer, co-polymer of vinylidene chloride and acrylonitrile, co-polymer of butadien and acrylonitrile, polyamide resins, cellulose derivatives, co-polymer of styrene and butadien and polyester resins.

Thermosetting resins or reactive resins include, for example, phenol-formalin-novolak resins, phenol-formalin-resol resins, urea resins, melamine resins, unsaturated polyester resins, humidity setting type isocyanate terminated polyester resins, humidity setting type isocyanate terminated polyether resins and polyisocyanate-prepolymers.

These binder resin components are used in quantity ranging from about 5 wt. % to 100 wt. % for 100 parts by weight of magnetic powder.

Other items which may be added to magnetic coating constituting a magnetic recording medium of the invention include dispersing agents, lubricants, abrasives, antistatic agents, rust inhibitors and fungicides.

Dispersing agents mentioned above may include fattyacid having 12-18 carbon atoms, metallic soap made of alkali metal or alkaline earth metal of the aforementioned fatty acid, amide of the aforementioned fatty acid, polyalkyleneoxidealkylphosphoricacid ester, lecithin, and trialkylpoliolefineoxyquaternaryammonium salt. In addition to the foregoing, higher alcohol having not less than 12 carbon atoms and sulfuric ester may be included. These dispersing agents are added in quantity of 10 parts by weight or less for 100 parts by weight of magnetic powder.

Lubricants mentioned above may include silicone oil such as dialkylpolysiloxane, dialkoxypolysiloxane, and monoalkylmonoalkoxypolysiloxane, conductive fine powder such as graphite, plastic fine powder such as polyethylene and polypropylene, and fatty acid ester, though the aforementioned dispersing agents are also effective.

Abrasives mentioned above may include alumina, silicon carbide, chromium oxide, corundum, diamond and garnet. Abrasives having Moh's hardness of 5 or more and average particle size of 0.05-5 μm may be used. These abrasives are added to magnetic powder in quantity ranging from 0.5 parts by weight to 15 parts by weight for 100 parts by weight of magnetic powder.

Antistatic agents mentioned above may include conductive fine powder such as carbon black which are added in the range from 0.01 parts by weight to 10 parts by weight for 100 parts by weight of magnetic powder.

When vaporizable rust inhibitors such as dicyclohexylaminnitrite, cyclohexylaminchlomate, diisopropylaminnitrite are used as a rust inhibitor, rust inhibiting effect may be enhanced. These rust inhibitors are used in quantity of 20 parts by weight or less for 100 parts by weight of ferromagnetic fine powder.

Fungicides mentioned above may include copper naphthenate, zinc naphthenate, mercury naphthenate, pentachlorophenol, trichlorophenol, p-dinitrophenol, sorbic acid, butyl p-hydroxybenzoate and di-hydroacetic acid etc., and they are used at the rate of 5 parts by weight or less for 100 parts by weight of binder.

Solvents to be used for manufacture of magnetic coating may be selected from those including ketone type solvents such as acetone, methyl ethyl ketone, methyl isobutyl ketone and cyclohexanone, ester type solvents such as methyl acetate, butyl acetate, ethyl lactate and acetic acid glycol monoethyl ether, glycol ether type solvents such as ether, glycoldimethylether, glycolmonoethylether and dioxane, tar type (aromatic hydrocarbon) solvents such as benzene, toluene and xylene, and chlorinated hydrocarbon type solvents such as methylenechloride, ethylenechloride, carbon tetrachloride, chloroform, ethylene chlorohydrin and dichlorobenzene.

When magnetic powder and binder are kneaded to be magnetic coating, magnetic powder and each component mentioned above are put in a kneader simultaneously, or in succession for kneading. For kneading and dispersing of the magnetic coating, any of various kneaders such as a dual roll mill, a triple roll mill, a ball mill, a sand grinder, a high speed impeller dispersing machine, a high speed stone mill, a high speed impact mill, Disperser, a kneader, a high speed mixer, a homogenizer and an ultrasonic dispersing machine may be used.

Magnetic coating obtained by kneading and dispersing the aforementioned magnetic powder, binders and various additives in a solvent is coated on a non-magnetic support and then oriented and dried. Thus, a magnetic recording medium of a coating type can be obtained.

Through the method mentioned above, a magnetic layer coated on a support is dried after being subjected, if necessary, to orientation of magnetic powder in the magnetic layer. In case of need, the magnetic layer is subjected to surface smoothing or to cutting to a desired shape, and thereby a magnetic recording medium can be obtained.

A material to be used for a non-magnetic support of a magnetic recording medium of the invention may be selected from those including polyesters such as polyethylene terephthalate or the like, polyolefins such as polyethylene and polypropylene, cellulose derivatives such as celluloseacetatebutylate and celluloseacetatepropionate, and vinyl type resins such as polyvinyl chloride and polyvinylidene chloride to which the invention is not naturally limited.

An effect of the present invention will be exemplified by the examples as follows.

EXAMPLES

Example 1

Following composition was used for preparing magnetic coating.

| <Magnetic coating> | |
|---|---|
| Ferromagnetic powder (described in Table 1) | 100 parts |
| Vinyl chloride resin | 8 parts |
| (MR 110 made by Nihon Zeon K.K.) | |
| Sulfonic acid metal salt-containing polyurethane resin | 5 parts |
| (UR 8700 made by Toyo Boseki K.K.) | |
| α-alumina | 5 parts |
| Carbon black (particle size 40 μm) | 0.5 parts |
| Myristic acid | 1 part |
| Stearic acid | 1 part |
| Butyl stearate | 1 part |
| Methyl ethyl ketone | 40 parts |
| Toluene | 40 parts |
| Cyclohexanone | 40 parts |

A solvent was partially added so that concentration for solid ingredients may be about 80% in the above composition, and actual load power of 0.2 kw or more per 1 kg of magnetic powder was applied for kneading for 10 minutes or more. Then, a mixer such as a high speed disperser was used for diluting to the above formula values. Then, zirconia beads having average particle size of 1.0 mm were used for dispersion in a sand mill, and polyisocyanate compounds (Colonet L . . . 5 parts) were added finally for adjustment.

Following composition was used for preparing non-magnetic coating.

| <Non-magnetic coating> | |
|---|---|
| Non-magnetic powder (described in Table 2) | 100 parts |
| Vinyl chloride resin (MR 110 made by Nihon Zeon K.K.) | 1 part |
| Sulfonic acid metal salt-containing polyurethane resin | 5 parts |
| (UR 8700 made by Toyo Boseki K.K.) | |
| Myristic acid | 1 part |
| Stearic acid | 1 part |
| Butyl stearate | 1 part |
| Methyl ethyul ketone | 35 parts |
| Toluene | 35 parts |
| Cyclohexanone | 35 parts |

A solvent was partially added so that actual load power of 0.2 kw or more per 1 kg of magnetic powder was applied for kneading for 10 minutes or more. Then, a mixer such as a high speed ... was used for diluting to the above formula values. Then, zirconia beads having average particle size of 1.0 mm were used for dispersion in a sand mill, and polyisocyanate compounds (Colonet L ... 5 parts) were added finally for adjustment.

TABLE 1

Powder (ferromagnetic powder) used in coating solution for test

| Magnetic coating | Powder | Aspect ratio (needle) | Aspect ratio (tabular) | HC | Br |
|---|---|---|---|---|---|
| A | Co-adhering Fe$_2$O$_3$ | 9 | — | 900 | 1750 |
| B | Fe—Al alloy (crystallite 180Å) | 8 | — | 1600 | 3000 |
| C | Ba-ferrite | — | 4 | 1500 | 1500 |
| D | Co—Ni (5%) alloy | — | 5 | 1500 | 2200 |
| E | Fe—Al alloy | — | 3 | 1400 | 2600 |

TABLE 2

Powder (non-magnetic powder) used in coating solution for test

| Non-magnetic coating | Powder | Average particle size (nm) | BET (m/g) |
|---|---|---|---|
| G | TiO$_2$ | 15 | 15 |
| H | TiO$_2$ | 35 | 36 |
| I | TiO$_2$ | 100 | 20 |
| J | ZnO | 30 | 20 |
| K | SnO$_2$ | 35 | 10 |

TABLE 3

| Coater | Parameters of the coaters (mm) | | |
|---|---|---|---|
| | Lb | a | n |
| 1-1 | 0.2 | 0.3 | 0.4 |
| 1-2 | 1 | 0.3 | 0.4 |
| 1-3 | 5 | 0.3 | 0.4 |
| 1-4 | 1 | 0.1 | 0.4 |
| 1-5 | 1 | 0.5 | 0.4 |
| 1-6 | 1 | 1 | 0.4 |
| 1-7 | 1 | 0.3 | 0.1 |
| 1-8 | 1 | 0.3 | 0.4 |
| 1-9 | 1 | 0.3 | 0.7 |
| 1-10 | 6 | 0.3 | 0.4 |
| 1-11 | 1 | 1.1 | 0.4 |
| 1-12 | 1 | 0.3 | 0.8 |
| 1-13 | Ther coater of OPI 2-35939 | | |

TABLE 4

| No. | Coater | Coating solution | Viscosity (cps) of coating solution under the share rate of | | Coating speed (m/min) | Thickness of layer (μ in wet) | Yield (%) |
|---|---|---|---|---|---|---|---|
| | | | 1000 (l/sec) | 10$^6$ (l/sec) | | | |
| Example-1 | 1-1 | A | 70 | 10 | 500 | 10 | 98 |
| Example-2 | 1-2 | A | 70 | 10 | 500 | 10 | 99 |
| Example-3 | 1-3 | A | 70 | 10 | 500 | 10 | 99 |
| Example-4 | 1-4 | A | 70 | 10 | 500 | 10 | 98 |
| Example-5 | 1-5 | A | 70 | 10 | 500 | 10 | 99 |
| Example-6 | 1-6 | A | 70 | 10 | 500 | 10 | 99 |
| Example-7 | 1-7 | A | 70 | 10 | 500 | 10 | 99 |
| Example-8 | 1-8 | A | 70 | 10 | 500 | 10 | 98 |
| Example-9 | 1-9 | A | 70 | 10 | 500 | 10 | 99 |
| Comparative-1 | 1-10 | A | 70 | 10 | 500 | 10 | 65 |
| Comparative-2 | 1-11 | A | 70 | 10 | 500 | 10 | 72 |
| Comparative-3 | 1-12 | A | 70 | 10 | 500 | 10 | 71 |
| Comparative-4 | 1-13 | A | 70 | 10 | 500 | 10 | 22 |

TABLE 5

| Coater | Parameters of the coaters (mm) | | | | | | |
|---|---|---|---|---|---|---|---|
| | Lb | X1 | X2 | Hb | r1 | r2 | r3 |
| 2-1 | 1 | 0.3 | 0.6 | 0.2 | 1 | 3 | 8 |
| 2-2 | 0.2 | 0.06 | 0.12 | 0.04 | 1 | 3 | 8 |
| 2-3 | 5 | 1.5 | 3 | 1 | 1 | 3 | 8 |
| 2-4 | 1 | 0.3 | 0.6 | 0.2 | 2 | 5 | 30 |
| 2-5 | 0.2 | 0.06 | 0.12 | 0.04 | 2 | 5 | 30 |
| 2-6 | 5 | 1.5 | 3 | 1 | 2 | 5 | 30 |
| 2-7 | 0.1 | 0.03 | 0.06 | 0.02 | 1 | 3 | 8 |
| 2-8 | 6 | 1.8 | 3.6 | 1.2 | 1 | 3 | 8 |
| 2-9 | 1 | 0.3 | 0.6 | 0.2 | 4 | 3 | 8 |
| 1-13 | The coater of OPI 2-35939 | | | | | | |

TABLE 6

| No. | Coater | Coating solution | Viscosity (cps) of coating solution under the share rate of | | Coating speed (m/min) | Thickness of layer (μ in wet) | Yield (%) |
|---|---|---|---|---|---|---|---|
| | | | 1000 (l/sec) | 10$^6$ (l/sec) | | | |
| Example-10 | 2-1 | A | 70 | 10 | 800 | 20 | 100 |
| Example-11 | 2-2 | A | 70 | 10 | 800 | 20 | 100 |
| Example-12 | 2-3 | A | 70 | 10 | 800 | 20 | 100 |
| Example-13 | 2-4 | A | 70 | 10 | 800 | 20 | 100 |
| Example-14 | 2-5 | A | 70 | 10 | 800 | 20 | 100 |
| Example-15 | 2-6 | A | 70 | 10 | 800 | 20 | 100 |
| Comparative-5 | 2-7 | A | 70 | 10 | 800 | 20 | 66 |
| Comparative-6 | 2-8 | A | 70 | 10 | 800 | 20 | 71 |
| Comparative-7 | 2-9 | A | 70 | 10 | 800 | 20 | 69 |
| Comparative-8 | 1-13 | A | 70 | 10 | 800 | 20 | 32 |
| Example-16 | 2-1 | B | 100 | 30 | 800 | 20 | 100 |
| Example-17 | 2-2 | B | 100 | 30 | 800 | 20 | 100 |
| Example-18 | 2-3 | B | 100 | 30 | 800 | 20 | 100 |
| Example-19 | 2-4 | B | 100 | 30 | 800 | 20 | 100 |
| Example-20 | 2-5 | B | 100 | 30 | 800 | 20 | 100 |
| Example-21 | 2-5 | B | 100 | 30 | 800 | 20 | 100 |
| Example-22 | 2-6 | B | 100 | 30 | 800 | 20 | 100 |
| Comparative-9 | 2-7 | B | 100 | 30 | 500 | 20 | 52 |

TABLE 6-continued

| No. | Coater | Coating solution | Viscosity (cps) of coating solution under the share rate of 1000 (1/sec) | Viscosity (cps) of coating solution under the share rate of $10^6$ (1/sec) | Coating speed (m/min) | Thickness of layer (μ in wet) | Yield (%) |
|---|---|---|---|---|---|---|---|
| Comparative-10 | 2-8 | B | 100 | 30 | 800 | 20 | 57 |
| Comparative-11 | 2-9 | B | 100 | 30 | 800 | 20 | 57 |
| Comparative-12 | 1-13 | B | 100 | 30 | 800 | 20 | 19 |
| Example-22 | 2-1 | C | 80 | 25 | 800 | 20 | 100 |
| Example-23 | 2-1 | D | 110 | 22 | 800 | 20 | 100 |
| Example-24 | 2-1 | E | 130 | 28 | 800 | 20 | 100 |
| Example-25 | 2-1 | G | 220 | 70 | 800 | 20 | 98 |
| Example-26 | 2-1 | H | 100 | 50 | 800 | 20 | 100 |
| Example-27 | 2-1 | I | 75 | 10 | 800 | 20 | 100 |
| Example-28 | 2-1 | J | 180 | 65 | 800 | 20 | 100 |
| Example-29 | 2-1 | K | 170 | 52 | 800 | 20 | 100 |
| Comparative-13 | 1-13 | C | 80 | 25 | 800 | 20 | 12 |
| Comparative-14 | 1-13 | D | 110 | 22 | 800 | 20 | 13 |
| Comparative-15 | 1-13 | E | 130 | 28 | 800 | 20 | 11 |
| Comparative-16 | 1-13 | G | 220 | 70 | 800 | 20 | 0 |
| Comparative-17 | 1-13 | H | 100 | 50 | 800 | 20 | 15 |
| Comparative-18 | 1-13 | I | 75 | 10 | 800 | 20 | 21 |
| Comparative-19 | 1-13 | J | 180 | 65 | 800 | 20 | 0 |
| Comparative-20 | 1-13 | K | 170 | 52 | 800 | 20 | 11 |

TABLE 7

| Coater | Parameters of the coaters (mm) | | | | | | Downstream side |
|---|---|---|---|---|---|---|---|
| | Lb | X1 | X2 | Hb | r1 | r2 | |
| 3-1 | 1 | 0.3 | 0.6 | 0.2 | 1 | 30 | Linear |
| 3-2 | 0.2 | 0.06 | 0.12 | 0.04 | 1 | 30 | Linear |
| 3-3 | 5 | 1.5 | 3 | 1 | 1 | 30 | Linear |
| 3-4 | 1 | 0.3 | 0.6 | 0.2 | 2 | 5 | Linear |
| 3-5 | 0.2 | 0.06 | 0.12 | 0.04 | 2 | 5 | Linear |
| 3-6 | 5 | 1.5 | 3 | 1 | 2 | 5 | Linear |
| 3-7 | 0.1 | 0.03 | 0.06 | 0.02 | 1 | 3 | Linear |
| 3-8 | 6 | 1.8 | 3.6 | 1.2 | 1 | 3 | Linear |
| 3-9 | 1 | 0.3 | 0.6 | 0.3 | 4 | 3 | Linear |
| 1-13 | The coater of OPI 2-35939 | | | | | | |

TABLE 8

| No. | Coater | Coating solution | Viscosity (cps) of coating solution under the share rate of 1000 (1/sec) | Viscosity (cps) of coating solution under the share rate of $10^6$ (1/sec) | Coating speed (m/min) | Thickness of layer (μ in wet) | Yield (%) | RF output (dB) |
|---|---|---|---|---|---|---|---|---|
| Example-30 | 3-1 | A | 70 | 10 | 600 | 20 | 98 | 1.9 |
| Example-31 | 3-2 | A | 70 | 10 | 600 | 20 | 99 | 1.6 |
| Example-32 | 3-03 | A | 70 | 10 | 600 | 20 | 99 | 1.5 |
| Example-33 | 3-4 | A | 70 | 10 | 600 | 20 | 98 | 1.7 |
| Example-34 | 3-5 | A | 70 | 10 | 600 | 20 | 99 | 1.8 |
| Example-35 | 3-6 | A | 70 | 10 | 600 | 20 | 99 | 0.2 |
| Comparative-21 | 3-7 | A | 70 | 10 | 600 | 20 | 62 | 0.3 |
| Comparative-22 | 3-8 | A | 70 | 10 | 600 | 20 | 61 | 0.1 |
| Comparative-23 | 3-9 | A | 70 | 10 | 600 | 20 | 69 | 0.15 |
| Comparative-24 | 1-13 | A | 70 | 10 | 600 | 20 | 32 | 0 |
| Example-36 | 3-1 | B | 100 | 30 | 600 | 20 | 99 | 5.8 |
| Example-37 | 3-2 | B | 100 | 30 | 600 | 20 | 98 | 5.5 |
| Example-38 | 3-3 | B | 100 | 30 | 600 | 20 | 100 | 5.3 |
| Example-39 | 3-4 | B | 100 | 30 | 600 | 20 | 99 | 5.4 |
| Example-40 | 3-5 | B | 100 | 30 | 600 | 20 | 99 | 5.6 |
| Example-41 | 3-6 | B | 100 | 30 | 600 | 20 | 99 | 5.7 |
| Comparative-25 | 3-7 | B | 100 | 30 | 600 | 20 | 52 | 4.5 |
| Comparative-26 | 3-8 | B | 100 | 30 | 600 | 20 | 45 | 4.2 |
| Comparative-27 | 3-9 | B | 100 | 30 | 600 | 20 | 48 | 4.4 |
| Comparative-28 | 1-13 | B | 100 | 30 | 600 | 20 | 9 | 3.9 |
| Example-42 | 3-1 | C | 80 | 25 | 600 | 20 | 98 | 6.5 |
| Example-43 | 3-1 | D | 110 | 22 | 600 | 20 | 97 | 7.6 |
| Example-44 | 3-1 | E | 130 | 28 | 600 | 20 | 97 | 8.7 |
| Comparative-29 | 1-13 | C | 80 | 25 | 600 | 20 | 12 | 5.1 |
| Comparative-30 | 1-13 | D | 110 | 22 | 600 | 20 | 13 | 6.1 |
| Comparative-31 | 1-13 | E | 130 | 28 | 600 | 20 | 11 | 6.5 |

TABLE 9

| Coater | Parameters of the coaters (mm) | | | | | | | | | | | | | |
|---|---|---|---|---|---|---|---|---|---|---|---|---|---|---|
| | Lc | X1 | X2 | Hc | r1 | r2 | r3 | Lb | X3 | X4 | Hb | r4 | r5 | r6 |
| 4-1 | 1 | 0.3 | 0.6 | 0.2 | 1 | 3 | 15 | 1 | 0.3 | 0.6 | 0.2 | 1 | 6 | 15 |
| 4-2 | 0.2 | 0.06 | 0.12 | 0.04 | 1 | 3 | 15 | 0.2 | 0.06 | 0.12 | 0.04 | 1 | 6 | 15 |
| 4-3 | 5 | 1.5 | 3 | 1 | 1 | 3 | 15 | 5 | 1.5 | 3 | 1 | 1 | 6 | 15 |
| 4-4 | 1 | 0.3 | 0.6 | 0.2 | 0.5 | 5 | 30 | 1 | 0.3 | 0.6 | 0.2 | 2 | 15 | 30 |
| 4-5 | 0.2 | 0.06 | 0.12 | 0.04 | 0.5 | 5 | 30 | 0.2 | 0.06 | 0.12 | 0.04 | 2 | 15 | 30 |
| 4-6 | 5 | 1.5 | 3 | 1 | 0.5 | 5 | 30 | 5 | 1.5 | 3 | 1 | 2 | 15 | 30 |

TABLE 9-continued

| Coater | Lc | X1 | X2 | Hc | r1 | r2 | r3 | Lb | X3 | X4 | Hb | r4 | r5 | r6 |
|---|---|---|---|---|---|---|---|---|---|---|---|---|---|---|
| 4-7 | 6 | 1.8 | 3.6 | 1.2 | 1 | 3 | 15 | 1 | 0.3 | 0.6 | 0.2 | 1 | 6 | 15 |
| 4-8 | 1 | 0.3 | 0.6 | 0.2 | 1 | 3 | 15 | 6 | 1.8 | 3.6 | 1.2 | 1 | 6 | 15 |
| 4-9 | 6 | 1.8 | 3.6 | 1.2 | 1 | 3 | 15 | 6 | 1.8 | 3.6 | 1.2 | 1 | 6 | 15 |
| 4-10 | The coater of OPI 2-251265 | | | | | | | | | | | | | |

TABLE 10

| No. | Coater | Coating solution upper layer | Coating solution lower layer | Viscosity (cps) upper layer | Viscosity (cps) lower layer | Coating speed (m/min) | Yield (%) | Output variation (db) |
|---|---|---|---|---|---|---|---|---|
| Example-45 | 4-1 | B | A | 55 | 60 | 600 | 98 | 0.5 |
| Example-46 | 4-2 | B | A | 55 | 60 | 600 | 99 | 0.4 |
| Example-47 | 4-3 | B | A | 55 | 60 | 600 | 99 | 0.3 |
| Example-48 | 4-4 | B | A | 55 | 60 | 600 | 98 | 0.5 |
| Example-49 | 4-5 | B | A | 55 | 60 | 600 | 99 | 0.6 |
| Example-50 | 4-6 | B | A | 55 | 60 | 600 | 99 | 0.6 |
| Comparative-32 | 4-7 | B | A | 55 | 60 | 600 | 62 | 1.5 |
| Comparative-33 | 4-8 | B | A | 55 | 60 | 600 | 61 | 2 |
| Comparative-34 | 4-9 | B | A | 55 | 60 | 600 | 69 | 1.9 |
| Comparative-35 | 4-10 | B | A | 55 | 75 | 600 | 25 | 2.9 |
| Example-51 | 4-1 | B | G | 55 | 75 | 600 | 99 | 0.3 |
| Example-52 | 4-2 | B | G | 55 | 75 | 600 | 99 | 0.2 |
| Example-53 | 4-3 | B | G | 55 | 75 | 600 | 100 | 0.3 |
| Example-54 | 4-4 | B | G | 55 | 75 | 600 | 99 | 0.2 |
| Example-55 | 4-5 | B | G | 55 | 75 | 600 | 99 | 0.3 |
| Example-56 | 4-6 | B | G | 55 | 75 | 600 | 99 | 0.1 |
| Comparative-36 | 4-7 | B | G | 55 | 75 | 600 | 52 | 0.2 |
| Comparative-37 | 4-8 | B | G | 55 | 75 | 600 | 45 | 2.8 |
| Comparative-38 | 4-9 | B | G | 55 | 75 | 600 | 48 | 3 |
| Comparative-39 | 4-10 | B | G | 55 | 75 | 600 | 12 | 4.2 |
| Example-57 | 4-1 | D | J | 68 | 55 | 600 | 99 | 0.7 |
| Example-58 | 4-2 | D | J | 68 | 55 | 600 | 99 | 0.6 |
| Example-59 | 4-3 | D | J | 68 | 55 | 600 | 99 | 0.5 |
| Example-60 | 4-4 | D | J | 68 | 55 | 600 | 98 | 0.8 |
| Example-61 | 4-5 | D | J | 68 | 55 | 600 | 99 | 0.6 |
| Example-62 | 4-6 | D | J | 68 | 55 | 600 | 99 | 0.8 |
| Comparative-40 | 4-7 | D | J | 68 | 55 | 600 | 56 | 3.8 |
| Comparative-41 | 4-8 | D | J | 68 | 55 | 600 | 57 | 4.2 |
| Comparative-42 | 4-9 | D | J | 68 | 55 | 600 | 42 | 4.9 |
| Comparative-43 | 4-10 | D | J | 68 | 55 | 600 | 20 | 5.6 |

By using a diluting solution of ethyl/ketone/toluene/cyclohexanone=1/1/1 (ratio by weight), a basic solution having the composition described above was adjusted so that viscosity thereof under the rate of shear shown below may arrive at a predetermined value. In an effective method for adding the diluting solution, a constant amount of the diluting solution is added each time first, and then viscosity is measured at each rate of shearing, a calibration curve is determined from the results of the measurement, and an adding amount roughly estimated based on the calibration curve is determined. Incidentally, Rotovisco (made by Haake) was used for measurement of viscosity.

A dispersed coating solution thus prepared was coated on an 8 μm PET base by means of a coater having the structure (1) of the invention, with a comparative example represented by a coater disclosed in Japanese Patent O.P.I. Publication No. 35959/1990. In that case, a leading edge of a head was positioned mostly at the middle of the span of 500 mm between two support rolls, the head was pushed toward the base with a contact point between the head and the base supported by the rolls defined as "0", thus extrusion coating was conducted at the position where excellent coatability was obtained.

As conditions for coating, an angle formed by a tangent line at the downstream end point on the back edge surface and a support running continuously was kept within a range from −5° to +5° and conditions offering good coatability were employed.

In the case of the foregoing, the width of the coater was 660 mm and tension for conveyance was 20 kg per width. As an evaluation method for coatability, X-rays were used continually on an on-line basis during the coating operation, layer thickness distribution in the coating direction was measured, a ½-inch-wide slit in the portion where the layer thickness distribution varied by ±10% in the coating direction was designated as NG, and the yield (coating yield) (%) after coating of 10,000 m was used for the evaluation. Since the width is 660 mm, when eliminating useless portions at both sides, 50 slits in total can be obtained by slitting after coating and drying.

Results of comparative experiments are shown in Tables 3 and 4. The tables show that the coating apparatus of the invention offers excellent coating stability.

Next, a coating apparatus explained in the Structure (2) of the invention and a coating method using the apparatus will be explained.

A dispersed coating solution identical to the foregoing was coated on an 8 μm—PET base by means of a coater having the structure (2) of the invention, with a comparative example represented by a coater disclosed in Japanese Patent O.P.I. Publication No. 35959/1990. In that case, a leading edge of a head was positioned mostly at the middle of the span of 500 mm between two support rolls, the head was pushed toward the base with a contact point between the head and the base supported by the rolls defined as "0", thus extrusion coating was conducted at the position where excellent coatability was obtained.

As conditions for coating, an angle formed by a tangent line at the downstream end point on the back edge surface and a support running continuously was kept within a range from −5° to +5° and conditions offering good coatability were employed.

The width of the coater was 660 mm and tension for conveyance was 20 kg per width, which was the same as the aforementioned example. As an evaluation method for coatability, X-rays were used continually on an on-line basis during the coating operation, layer thickness distribution in the coating direction was measured, a ½-inch-wide slip in the portion where the layer thickness distribution varied by ±10% in the coating direction was designated as NG, and the yield (coating yield) (%) after coating of 10,000 m was used for the evaluation.

The coaters used in the example are shown in Table 5 and the results of experiments are shown in Table 6. The tables show that owing to the effect of a plurality of curvatures on the back edge surface, excellent coating yield can be obtained even in the case of the coating speed which is extremely high. Further, the results of experiments show that the coating apparatus of the invention can offer excellent coatability to a coating solution wherein not only magnetic powder by also non-magnetic powder are dispersed.

Further, the results of experiments made on the coating apparatus which is one described in the Structure (2) of the invention wherein the sectional shape of the back edge surface is composed of a curve having one or two curvatures and a straight line, will be shown. The coaters used in the example are shown in the following Table 7 and the results of experiments are shown in Table 8. Incidentally, the conditions for the experiments and conditions of coating solutions which are not described in the tables are exactly the same as those in the previous example. For comparing the values of electromagnetic conversion characteristics, however, orientation in the atmosphere of the magnetic field of 6000 gauss by means of a electromagnet was conducted for about two seconds during drying and calendering in the longitudinal direction in the case that needle powder was used and in the vertical direction in the case that tabular powder was used, and then slitting and loading into an 8 mm cassette were conducted. After that, an 8 mm video recorder (Sony EVO9500) available on the market was used for recording a single wave of 7 MHz, then its signals were reproduced and reproduced output in 7 MHz were measured by an output level measuring instrument.

Incidentally, with regard to output as electro-magnetic conversion characteristics, 0 db is given to Comparative example - 24. As a result, it is clear that samples prepared by the coater of the invention show excellent values of output compared with comparative examples, though there is observed total difference caused by the difference of magnetic powder. Even in the case of yield of coating, it is clear that examples of the invention are superior to comparative examples. This effect is nothing but improvement on the coated surface achieved by a straight line employed on the downstream end portion on the back edge surface. However, coatability at high coating speed on this coating apparatus is not of a high speed type when compared with coating apparatuses shown in Table 6, and it was impossible to coat in the present experiment at the coating speed of 800 m/min. It is understood, therefore, that coatability at high speed is improved by the sectional shape having a plurality of curvatures, a coating apparatus of a high speed type is offered by the sectional shape composed entirely of curvatures, and the sectional shape whose downstream end portion is composed of a straight line can improve the conditions on the coated surface after coating and drying though it slightly deteriorates coatability at high coating speed.

EXAMPLE 2

A magnetic powder-dispersed solution and a non-magnetic powder-dispersed solution identical to those used in Example 1 were used for coating on an 8 μm PET base by means of a coater of a wet-on-wet simultaneous multi-layer coating type having the structure (3) of the invention which has two slits, a front bar, a center bar and a back bar, with a comparative example represented by a coater disclosed in Japanese Patent O.P.I. Publication No. 251265/1990. In that case, a leading edge of a head was positioned mostly at the middle of the span of 500 mm between two support rolls, the head was pushed toward the base with a contact point between the head and the base supported by the rolls defined as "0", thus extrusion coating was conducted at the position where excellent coatability was obtained.

As conditions for coating, an angle formed by a tangent line at the downstream end point on the back edge surface and a support running continuously was kept within a range from −5° to +5° and conditions offering good coatability were employed.

In the case of the foregoing, the width of the coater was 660 mm and tension for conveyance was 20 kg per width. As an evaluation method for coatability, X-rays were used continually on an on-line basis during the coating operation, layer thickness distribution in the coating direction was measured, a ½-inch-wide slip in the portion where the layer thickness distribution varied by ±10% in the coating direction was designated as NG, and the yield (coating yield) (%) after coating of 10,000 m was used for the evaluation.

Further, for comparing the values of electro-magnetic conversion characteristics, after setting the coating thickness so that the thickness of dried coating may be 0.3 m for the upper layer and 2.0 m for the lower layer, orientation in the atmosphere of the magnetic field of 6000 gauss by means of a electromagnet was conducted for about two seconds during drying and calendering in the longitudinal direction in the case that needle powder was used and in the vertical direction in the case that tabular powder was used, and then slitting and loading into an 8 mm cassette were conducted. After that, an 8 mm video recorder (Sony EVO9500) available on the market was used for recording a single wave of 7 MHz, then its signals were reproduced for 30 seconds and measured, the reproduced output in 7 MHz in terms of variation thereof for 30 seconds were measured by an output level measuring instrument. Incidentally, coating conditions which are not described in the table are exactly the same as those in Example 1.

The results of the experiments are shown in Tables 9 and 10. As is clear from the results on the tables possible, by using the coating apparatus of the invention, to coat extremely uniformly on a high speed multi-layer coating basis with a coating yield which is extremely excellent.

What is claimed is:
1. An extrusion coating apparatus comprising:
a front bar, a back bar, and a slit in between, from which a coating solution is extruded onto a surface of a flexible support which runs continuously along a front-edge-surface of the front bar and a back-edge-surface of the back bar, wherein, in a cross-section of said apparatus along a running direction of said support, a cross-sectional curve of the back-edge-surface is expressed as:

$$y = a(x/L_b)^n$$

provided that an upstream end of the back-edge-surface is an origin of coordinates, an extended line through a downstream end of the front-edge-surface and the origin of coordinates is X-axis which has a positive direction towards said running direction,
and an extended line through the origin of coordinates which is crossed vertically with said X-axis is Y-axis which has a positive direction towards the flexible support from the origin, wherein a and n each satisfy equation $$0.1 \leq a \leq 1.0$$

$$0.1 \leq n \leq 0.7$$

$L_b$ represents a projected length of the back edge-surface onto the X-axis in said cross-section satisfying, $$0.2 \text{ mm} \leq L_b \leq 5 \text{ mm}$$

x represents a distance from the origin in the X-axis, and y represents a value in the Y-axis;
and a tangential line of a cross-sectional curve of the front-edge-surface at a downstream end traverses the cross-section of the back bar.

2. An extrusion coating apparatus comprising:
a front bar, a back bar, and a slit in between, from which a coating solution is extruded onto a surface of a flexible support which runs continuously along a front-edge-surface of the front bar and a back-edge-surface of the back bar, wherein, in a cross-section of said apparatus along a running direction of said support, a cross-sectional curve of the back-edge-surface consists of, a first arc having a curvature $r_1$, a second arc having a curvature $r_2$, a third arc having a curvature of $r_3$, from an upstream end, to a downstream end thereof, wherein the first arc, the second arc and the third arc each has a center on the back bar;
and a tangential line at a downstream end of a cross-sectional curve of the front-edge-surface traverses a cross-section of the back bar.

3. The apparatus of claim 2, wherein the cross-sectional curve of the back-edge-surface satisfies $$0.2 \text{ mm} \leq L_b \leq 5.0 \text{ mm}$$

$$0 \leq X_1/L_b \leq 0.5$$

$$0.2 \leq X_2/L_b \leq 0.8$$

$$-0.5 \leq H_b/L_b \leq 0.5$$

$$0.05 \text{ mm} \leq r_1 \leq 2.0 \text{ mm}$$

$$0.5 \text{ mm} \leq r_2 \leq 5.0 \text{ mm}$$

$$6.0 \text{ mm} \leq r_3 \leq 30 \text{ mm}$$

$$X_1 < r_1$$

$$X_2 - X_1 < r_2$$

$$L_b - X_2 < r_3$$

provided that the upstream end of the back-edge-surface is an origin of the coordinates and an extended line through the downstream end of the cross-sectional curve of the front-edge-surface and the origin of coordinates is an X-axis which has a positive direction towards said running direction and an extended line through the origin of the coordinates which is crossed vertically with said X-axis is Y-axis which has a positive direction towards the flexible support from the origin;
wherein $X_1$ and $X_2$ each represents a projected point of a first joint of the first arc and the second arc, and a second joint of the second arc and the third arc onto the X-axis, $H_b$ and $L_b$ each is a projected point of a downstream end of the cross-sectional curve of the back edge-surface onto Y-axis and X-axis respectively, and $H_b$ and $L_b$ each is a distance from the origin, $H_b$ having a minus sign in case that $H_b$ is located on a negative side of the Y-axis,
and a first angle between a tangent of the first arc and a tangent of the second arc at the first joint is less than 5° and a second angle between a tangent of the second arc and a tangent of the third arc at the second joint is less than 5°;
and a tangential line of the cross-sectional curve of the front-edge-surface at the downstream end traverses the back bar.

4. An extrusion coating apparatus comprising:
a front bar, a back bar, and a slit in between, from which a coating solution is extruded onto a surface of a flexible support which runs continuously along a front-edge-surface of the front bar and a back-edge-surface of the back bar, in a cross-section of said apparatus along a running direction of said support a cross-sectional curve of the back-edge-surface consists of, a first arc having a curvature $r_1$, a second arc having a curvature $r_2$, and a straight line from an upstream end to a downstream end thereof; wherein the first arc and the second arc each has a center on the back bar side and
a tangential line at a downstream end of a cross sectional curve of the front-edge-surface traverses a cross-section of the back bar.

5. The apparatus of claim 4, wherein the cross-sectional curve of the back-edge-surface satisfies $$0.2 \text{ mm} \leq L_b \leq 5.0 \text{ mm}$$

$$0 \leq X_1/L_b \leq 0.5$$

$$0.2 \leq X_2/L_b \leq 0.8$$

$$-0.5 \leq H_b/L_b \leq 0.5$$

$$0.05 \text{ mm} \leq r_1 \leq 5.0 \text{ mm}$$

$$5.0 \text{ mm} \leq r_2 \leq 30.0 \text{ mm}$$

$$X_1 < r_1$$

$X_2 - X_1 < r_2$ $L_b - X_2 < r_3$ provided that the upstream end of the back-edge-surface is an origin of the coordinates and an extended line through the downstream end of the cross-sectional curve of the front-edge-surface and the origin of the coordinates is an X-axis which has a positive direction towards said running direction and an extended line through the origin of the coordinates which is crossed vertically with said X axis is an Y-axis which has a positive direction towards said support is the flexible support from the origin;
  wherein $X_1$ and $X_2$ each represents a projected point of a first joint of the first arc and the second arc, and a second joint of the second arc and the third arc onto x axis;
  Hb and Lb each is a projected point of a downstream end of the cross-sectional curve of the back-edge-surface, onto y axis and x axis respectively, and Hb and Lb each is a distance from the origin, Hb having a minus sign in case that Hb is located on a negative side of the Y-axis; and a first angle between a tangent of the first arc and a tangent of the second arc at the first joint is less than 5° and a second angle between a tangent of the second arc and a tangent of the third arc at the second joint is less than 5°;
  and a tangential line of the cross-sectional curve of the front-edge-surface at the downstream end traverses the back bar.

6. An extrusion coating apparatus comprising:
  a front bar, a center bar, a back bar, a first slit between the front bar and the center bar from which a first coating solution is extruded onto a surface of a flexible support which runs continuously along a front-edge-surface of the front bar, a center-edge-surface of the center bar and a back-edge-surface of the back bar;
  a second slit between the center bar and the back bar, from which a second coating solution is extruded onto a surface of the flexible support coated with the first coating solution;
  wherein, in a cross-section of said along a running direction of the support, a cross-sectional curve of the center-edge-surface consists of a first arc having a radius of curvature $r_1$, a second arc having a radius of curvature $r_2$, and a third arc having a radius of curvature $r_3$, from an upstream end to a downstream end thereof;
  and a cross-sectional curve of the back-edge-surface consists of, a fourth arc having a radius of curvature $r_4$, a fifth arc having a radius of curvature $r_5$, and a sixth arc having a radius of curvature $r_6$, from an upstream end to a downstream end thereof wherein the first arc, the second arc, and the third arc each has a center on the center bar side and the fourth arc, the fifth arc and the sixth arc each has a center on the back bar side.

7. The apparatus of claim 6, wherein the cross-sectional curve of the center-edge-surface and the back-edge-surface satisfies $0.1 \text{ mm} \leq L_c \leq 5.0 \text{ mm}$ $0 \leq X_1/L_c \leq 0.5$ $0.2 \leq X_2/L_c \leq 0.8$ $0 \leq H_c/L_c \leq 0.5$ $0.05 \text{ mm} \leq r_1 \leq 1.0 \text{ mm}$ $0.5 \text{ mm} \leq r_2 \leq 5.0 \text{ mm}$ $6.0 \text{ mm} \leq r_3 \leq 30.0 \text{ mm}$ $X_1 < r_1$ $X_2 - X_1 < r_2$ $L_c - X_2 < r_3$ provided that the upstream end of the center-edge-surface is an origin of the coordinates an extended line through the downstream end of the cross-sectional curve of the front-edge-surface and the origin of coordinates is an X-axis which has a positive direction towards the running direction and an extended line through the origin of coordinates which is crossed vertically with X-axis is Y-axis which has a positive direction towards the flexible support from the origin;
  wherein $X_1$ and $X_2$ each represents a projected length of the first arc, and the first arc plus the second arc onto $X_1$-axis, Hc and Lc each is a projected point of the downstream end of the cross-sectional curve of the center-edge-surface onto the $Y_1$-axis and $X_1$-axis respectively;

$0.2 \text{ mm} \leq L_b \leq 5.0 \text{ mm}$ $0 \leq X_3/L_b \leq 0.5$ $0.2 \leq X_4/L_b \leq 0.8$ $0 \leq H_b/L_b \leq 0.5$ $0.05 \text{ mm} \leq r_4 \leq 5.0 \text{ mm}$ $0.5 \text{ mm} \leq r_5 \leq 15.0 \text{ mm}$ $5.0 \text{ mm} \leq r_6 \leq 30.0 \text{ mm}$ $X_3 < r_4$ $X_4 - X_3 < r_5$ $L_b - X_4 < r_6$ provided that the upstream end of the back-edge-surface is an origin of the coordinates is an extended line trough the downstream end of the cross-sectional curve of the center-edge-surface and the origin to coordinates is an $X_2$-axis which has a positive direction towards the running direction and an extended line through the origin of coordinates which is crossed vertically with the $X_2$-axis is $Y_2$-axis which has a positive direction towards the flexible support from the origin;
  wherein $X_3$ and $X_4$ each represents a projected length of the fourth arc and the fourth arc plus the fifth arc onto $X_2$-axis, Hb and Lb each is a projected point of a downstream end of the cross-sectional curve of the back-edge-surface onto the $Y_2$-axis and $X_2$-axis respectively;
  and a first angle between a tangent of the first arc and a tangent of the second arc at a first joint thereof, a second angle between a tangent of the second arc and a tangent of the third arc at a second joint thereof, a third angle between a tangent of the fourth arc and a tangent of the fifth arc at a third joint thereof, and a fourth angle between a tangent of the fifth arc and a tangent of the sixth arc at a fourth joint thereof are each less than 5°.

* * * * *